United States Patent
Miyagi et al.

(10) Patent No.: US 7,912,280 B2
(45) Date of Patent: Mar. 22, 2011

(54) IMAGE PROCESSING APPARATUS, IMAGE PROCESSING METHOD, AND IMAGE PROCESSING PROGRAM

(75) Inventors: Arata Miyagi, Kawasaki (JP); Fumitaka Goto, Tokyo (JP); Fumihiro Goto, Kawasaki (JP); Masao Kato, Kawasaki (JP); Akitoshi Yamada, Yokohama (JP); Tetsuya Suwa, Yokohama (JP); Mitsuhiro Ono, Tokyo (JP); Yusuke Hashii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 11/769,801

(22) Filed: Jun. 28, 2007

(65) Prior Publication Data
US 2008/0002901 A1    Jan. 3, 2008

(30) Foreign Application Priority Data
Jun. 29, 2006    (JP) .................................. 2006-180379

(51) Int. Cl.
*G06K 9/00* (2006.01)
*G06K 9/40* (2006.01)

(52) U.S. Cl. ...................... 382/162; 358/518; 348/222.1

(58) Field of Classification Search .......... 382/162–167, 382/254–275; 358/518–521; 348/222.1–225.1
See application file for complete search history.

(56) References Cited

U.S. PATENT DOCUMENTS

| | | | |
|---|---|---|---|
| 4,577,235 A | 3/1986 | Kannapell et al. | 358/462 |
| 4,893,188 A | 1/1990 | Murakami et al. | 358/2.1 |
| 5,045,952 A | 9/1991 | Eschbach | |
| 5,087,972 A | 2/1992 | Sumi | 358/166 |
| 5,585,944 A * | 12/1996 | Rodriguez | 358/500 |
| 5,621,868 A * | 4/1997 | Mizutani et al. | 345/595 |
| 5,701,364 A | 12/1997 | Kanno | |
| 5,914,731 A | 6/1999 | Yano et al. | |
| 5,960,109 A * | 9/1999 | Shiau | 382/164 |
| 6,075,894 A | 6/2000 | Yano et al. | |
| 6,191,874 B1 | 2/2001 | Yamada et al. | |
| 6,243,070 B1 * | 6/2001 | Hill et al. | 345/589 |
| 6,292,621 B1 | 9/2001 | Tanaka et al. | |
| 6,480,624 B1 * | 11/2002 | Horie et al. | 382/165 |
| 6,608,926 B1 | 8/2003 | Suwa et al. | |
| 6,636,644 B1 * | 10/2003 | Itokawa | 382/243 |
| 6,636,646 B1 * | 10/2003 | Gindele | 382/274 |
| 6,694,051 B1 | 2/2004 | Yamazoe et al. | |
| 6,714,689 B1 | 3/2004 | Yano et al. | |

(Continued)

FOREIGN PATENT DOCUMENTS
EP    0415648    8/1990

(Continued)

*Primary Examiner* — Manav Seth
(74) *Attorney, Agent, or Firm* — Fitzpatrick, Cella, Harper & Scinto

(57) ABSTRACT

There is provided an image processing apparatus for applying an adjusting process to an image including multicolor image signals. An image area including a pixel to be processed is extracted, and one representative signal value is generated from signal values corresponding to a plurality of colors of pixels included in the image area (S2501). A feature amount associated with the image area is calculated based on the representative signal value (S2503, S2505, S2511), and a substitute candidate pixel common to the plurality of colors is selected from the image area based on the calculated feature amount (S2512). Signal values of the pixel to be processed are substituted by new pixel values, which are calculated from the signal values of the pixel to be processed and signal values of the substitute candidate pixel.

20 Claims, 24 Drawing Sheets

U.S. PATENT DOCUMENTS

| | | | |
|---|---|---|---|
| 6,856,704 B1 * | 2/2005 | Gallagher et al. | 382/263 |
| 6,934,412 B2 * | 8/2005 | Bares | 382/165 |
| 7,075,679 B2 | 7/2006 | Goto et al. | 358/3.01 |
| 7,274,491 B2 | 9/2007 | Yamada et al. | 358/3.06 |
| 7,280,703 B2 * | 10/2007 | Gallagher et al. | 382/260 |
| 7,289,154 B2 * | 10/2007 | Gindele | 348/364 |
| 7,308,137 B2 * | 12/2007 | Hsieh et al. | 382/170 |
| 7,426,312 B2 * | 9/2008 | Dance et al. | 382/254 |
| 7,466,319 B1 * | 12/2008 | Kirkland et al. | 345/589 |
| 7,570,810 B2 * | 8/2009 | Rai et al. | 382/167 |
| 7,684,617 B2 * | 3/2010 | Yoshiura | 382/167 |
| 7,746,503 B2 | 6/2010 | Lim | |
| 2003/0160875 A1 * | 8/2003 | Mitsunaga et al. | 348/222.1 |
| 2003/0179299 A1 | 9/2003 | Okada | |
| 2004/0196408 A1 | 10/2004 | Ishikawa et al. | |
| 2005/0134892 A1 | 6/2005 | Goto et al. | |
| 2006/0012693 A1 | 1/2006 | Sambongi | |
| 2008/0002216 A1 | 1/2008 | Matsushima | |
| 2008/0002766 A1 | 1/2008 | Suwa et al. | 375/240.12 |
| 2008/0002998 A1 | 1/2008 | Goto et al. | 399/39 |
| 2008/0007785 A1 | 1/2008 | Hashii et al. | |
| 2008/0018938 A1 | 1/2008 | Lee | 358/3.06 |
| 2008/0123150 A1 | 5/2008 | Ono et al. | |
| 2008/0123151 A1 | 5/2008 | Goto et al. | |
| 2008/0123153 A1 | 5/2008 | Yamada et al. | |
| 2008/0292568 A1 | 11/2008 | Tobia et al. | |

FOREIGN PATENT DOCUMENTS

| | | |
|---|---|---|
| EP | 087323 | 10/1998 |
| EP | 0871323 | 10/1998 |
| EP | 0898414 | 2/1999 |
| EP | 1065881 | 1/2001 |
| JP | 2620368 | 11/1990 |
| JP | 3215768 | 9/1991 |
| JP | 2002-077623 | 3/2002 |

* cited by examiner

F I G. 3
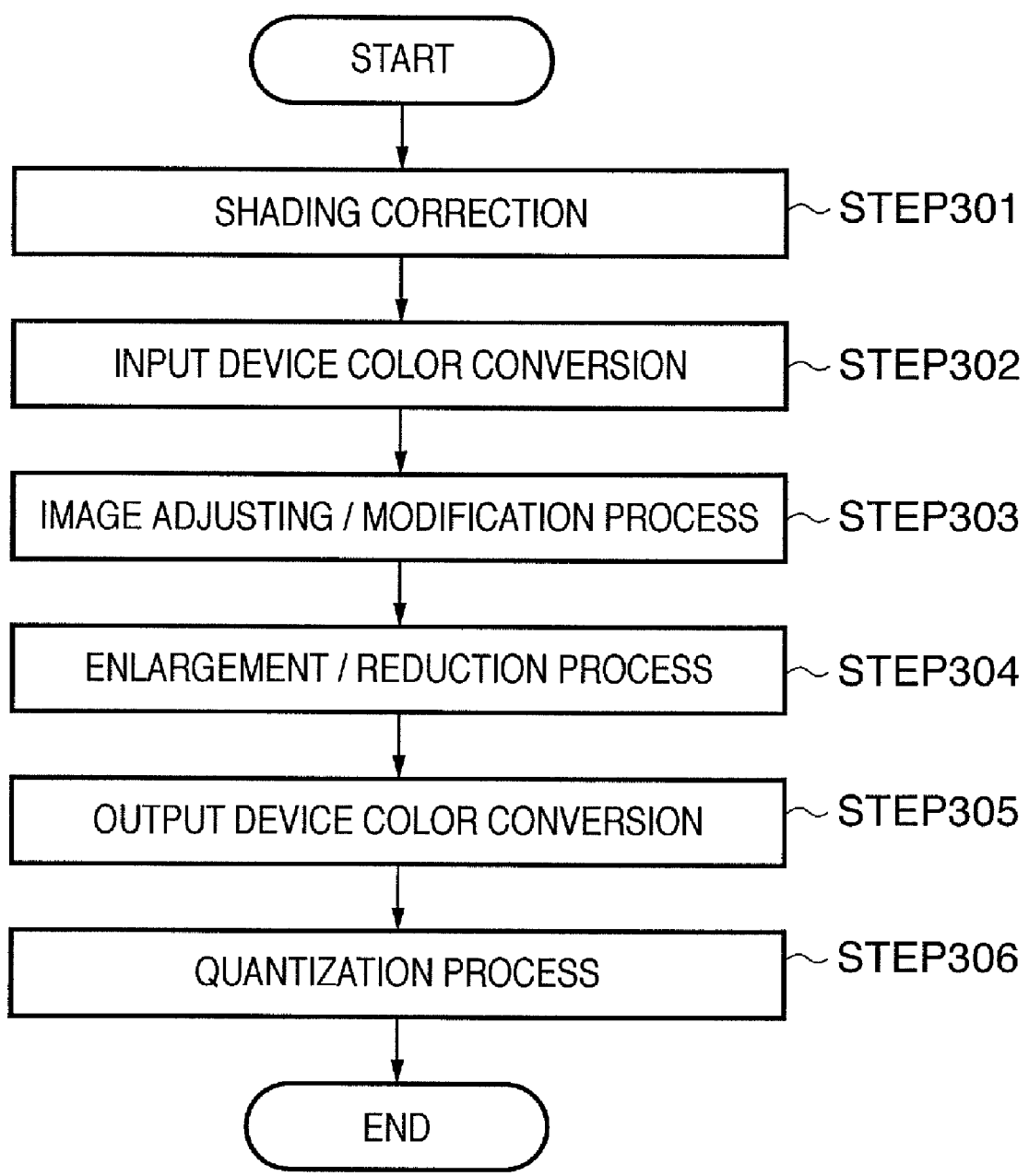

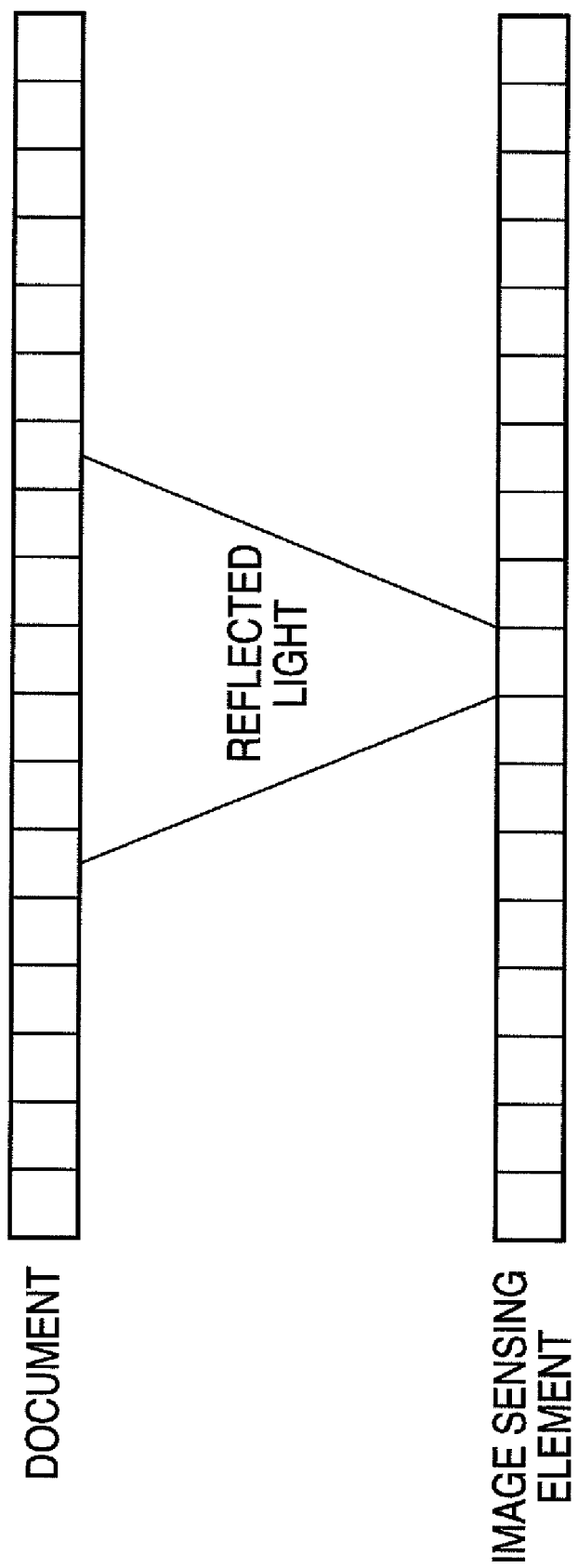

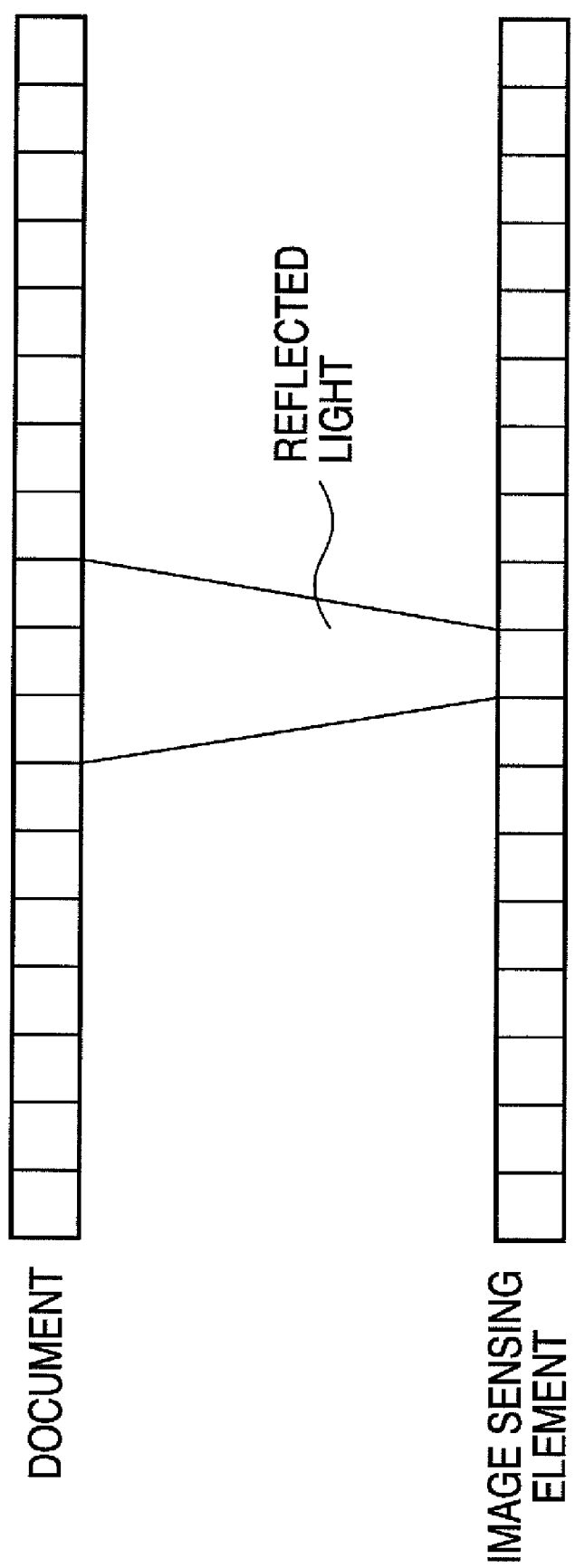

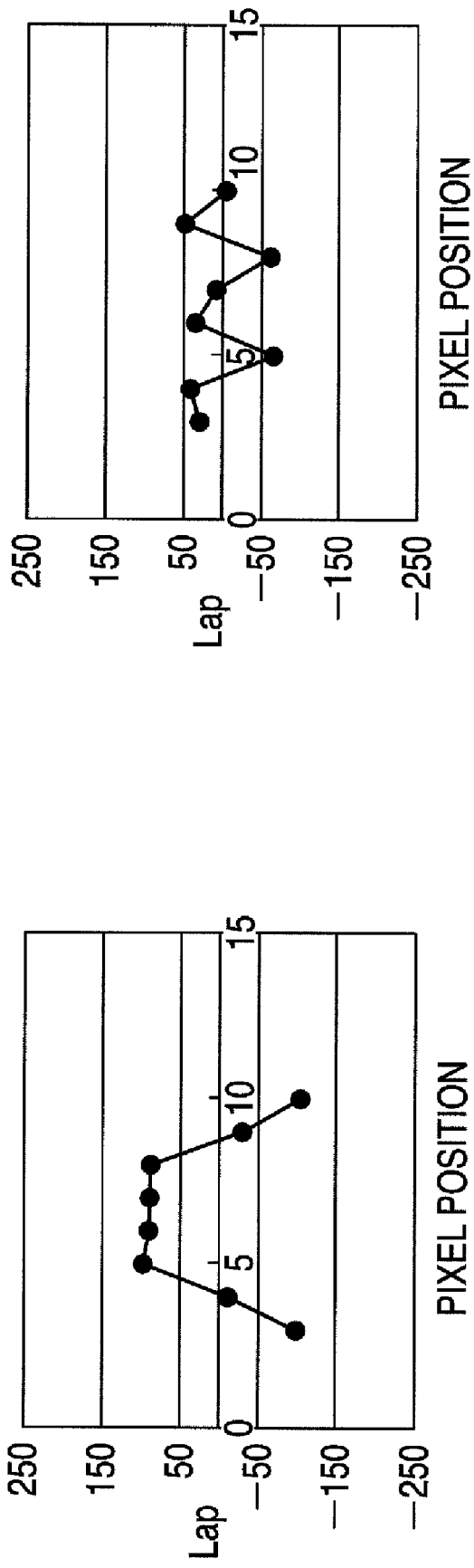

FIG. 17

| 0, 0, 240 | 0, 0, 240 | 0, 0, 192 | 48, 48, 144 | 96, 96, 96 | 144, 144, 48 | 192, 192, 0 | 240, 240, 0 |
|---|---|---|---|---|---|---|---|
| 0, 0, 240 | 0, 0, 240 | 0, 0, 192 | 48, 48, 144 | 96, 96, 96 | 144, 144, 48 | 192, 192, 0 | 240, 240, 0 |
| 0, 0, 240 | 0, 0, 240 | 0, 0, 192 | 48, 48, 144 | 96, 96, 96 | 144, 144, 48 | 192, 192, 0 | 240, 240, 0 |
| 0, 0, 240 | 0, 0, 240 | 0, 0, 192 | 48, 48, 144 | 96, 96, 96 | 144, 144, 48 | 192, 192, 0 | 240, 240, 0 |
| 0, 0, 240 | 0, 0, 240 | 0, 0, 192 | 48, 48, 144 | 96, 96, 96 | 144, 144, 48 | 192, 192, 0 | 240, 240, 0 |
| 0, 0, 240 | 0, 0, 240 | 0, 0, 192 | 48, 48, 144 | 96, 96, 96 | 144, 144, 48 | 192, 192, 0 | 240, 240, 0 |

FIG. 18

| 0, 0, 240 | 0, 0, 240 | 0, 0, 240 | 0, 0, 240 | 240, 240, 0 | 240, 240, 0 | 240, 240, 0 | 240, 240, 0 |
|---|---|---|---|---|---|---|---|
| 0, 0, 240 | 0, 0, 240 | 0, 0, 240 | 0, 0, 240 | 240, 240, 0 | 240, 240, 0 | 240, 240, 0 | 240, 240, 0 |
| 0, 0, 240 | 0, 0, 240 | 0, 0, 240 | 0, 0, 240 | 240, 240, 0 | 240, 240, 0 | 240, 240, 0 | 240, 240, 0 |
| 0, 0, 240 | 0, 0, 240 | 0, 0, 240 | 0, 0, 240 | 240, 240, 0 | 240, 240, 0 | 240, 240, 0 | 240, 240, 0 |
| 0, 0, 240 | 0, 0, 240 | 0, 0, 240 | 0, 0, 240 | 240, 240, 0 | 240, 240, 0 | 240, 240, 0 | 240, 240, 0 |
| 0, 0, 240 | 0, 0, 240 | 0, 0, 240 | 0, 0, 240 | 240, 240, 0 | 240, 240, 0 | 240, 240, 0 | 240, 240, 0 |

FIG. 19

| 0, 0, 240 | 0, 0, 240 | 0, 0, 240 | 0, 0, 0 | 240, 240, 0 | 240, 240, 0 | 240, 240, 0 | 240, 240, 0 |
|---|---|---|---|---|---|---|---|
| 0, 0, 240 | 0, 0, 240 | 0, 0, 240 | 0, 0, 0 | 240, 240, 0 | 240, 240, 0 | 240, 240, 0 | 240, 240, 0 |
| 0, 0, 240 | 0, 0, 240 | 0, 0, 240 | 0, 0, 0 | 240, 240, 0 | 240, 240, 0 | 240, 240, 0 | 240, 240, 0 |
| 0, 0, 240 | 0, 0, 240 | 0, 0, 240 | 0, 0, 0 | 240, 240, 0 | 240, 240, 0 | 240, 240, 0 | 240, 240, 0 |
| 0, 0, 240 | 0, 0, 240 | 0, 0, 240 | 0, 0, 0 | 240, 240, 0 | 240, 240, 0 | 240, 240, 0 | 240, 240, 0 |
| 0, 0, 240 | 0, 0, 240 | 0, 0, 240 | 0, 0, 0 | 240, 240, 0 | 240, 240, 0 | 240, 240, 0 | 240, 240, 0 |

FIG. 21A

| -6  | -14 | -16 | -14 | -6  |
|-----|-----|-----|-----|-----|
| -14 | 8   | 44  | 8   | -14 |
| -16 | 44  | 120 | 44  | -16 |
| -14 | 8   | 44  | 8   | -14 |
| -6  | -14 | -16 | -14 | -6  |

FIG. 21B

| -6  | -14 | -16 | -14 | -6  |
|-----|-----|-----|-----|-----|
| -14 | 8   | 44  | 8   | -14 |
| -16 | 44  | -8  | 44  | -16 |
| -14 | 8   | 44  | 8   | -14 |
| -6  | -14 | -16 | -14 | -6  |

# IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus for performing an image adjusting process, image processing method, and image processing program thereof.

2. Description of the Related Art

Conventionally, an image processing apparatus which applies an adjusting process to an image is known. For example, the edge of an image optically scanned by a scanner of a copying machine is more blurred than that of the original document image, and an image with poor sharpness is obtained when it is printed on a print medium intact. Upon applying an edge emphasis filter as an edge emphasis process after scanning for the purpose of enhancing the sharpness, an unnatural image is formed since the character edge is emphasized too strongly due to so-called overshoot or undershoot. Also, with this process, noise and moiré generated upon scanning are emphasized. In order to solve these problems, a technique that substitutes the pixel of interest by surrounding pixels is proposed (Japanese Patent No. 2620368).

However, with the aforementioned prior art, if there are multicolor image signals, appropriate adjusting means cannot be provided. For example, with the technique described in Japanese Patent No. 2620368, if a discrimination process is executed based on the distribution pattern of image signals independently for each of a plurality of colors, image emphasis signals suited to a color image cannot be generated, resulting in color misregistration.

Furthermore, upon checking the distribution pattern of image signal, if a large filter size is used, the calculation volume increases, resulting in an increase in volume of a process for generating an poorly defined signal.

SUMMARY OF THE INVENTION

There is provided an apparatus, method and program for performing an appropriate image-adjusting process to multicolor images.

According to one aspect of the present invention, the foregoing problem is solved by providing an image processing apparatus for applying an adjusting process to an image including multicolor image signals, comprising: an extracting unit arranged to extract an image area including a pixel to be processed; a generation unit arranged to generate one representative signal value from signal values corresponding to a plurality of colors of pixels included in the image area; a feature amount calculation unit arranged to calculate a feature amount associated with the pixel to be processed based on the representative signal value; pixel common to the plurality of colors from the image area based on the calculated feature amount; and a unit arranged to substitute signal values of the pixel to be processed by new pixel values, which are calculated from the signal values of the pixel to be processed and signal values of the substitute candidate pixel.

According to another aspect of the present invention, the foregoing problem is solved by providing an image processing apparatus for applying an adjusting process to an image including multicolor image signals, comprising: an extracting unit arranged to extract an image area including a pixel to be processed; an edge direction determination unit arranged to determine an edge direction in the image area; a selection unit arranged to select a substitute candidate pixel from a pixel group included in the edge direction; and a unit arranged to substitute signal values of the pixel to be processed by new pixel values, which are calculated from the signal values of the pixel to be processed and signal values of the substitute candidate pixel.

According to still another aspect of the present invention, the foregoing problem is solved by providing an image processing apparatus for applying an adjusting process to an image including multicolor image signals, comprising: an extracting unit arranged to extract an image area including a pixel to be processed; a generation unit arranged to generate one representative signal value from signal values corresponding to a plurality of colors of pixels included in the image area; a feature amount calculation unit arranged to calculate a feature amount associated with the pixel to be processed based on the representative signal value; a unit arranged to select a substitute candidate pixel common to the plurality of colors from the image area based on the calculated feature amount; an edge direction determination unit arranged to determine an edge direction based on the representative signal value in the image area; a selection unit arranged to select a substitute candidate pixel from a pixel group included in the edge direction; and a unit arranged to substitute signal values of the pixel to be processed by new pixel values, which are calculated from the signal values of the pixel to be processed and signal values of the substitute candidate pixel.

According to yet another aspect of the present invention, the foregoing problem is solved by providing an image processing method for applying an adjusting process to an image including multicolor image signals, comprising the steps of: extracting an image area including a pixel to be processed; generating one representative signal value from signal values corresponding to a plurality of colors of pixels included in the image area; calculating a feature amount associated with the pixel to be processed based on the representative signal value; selecting a substitute candidate pixel common to the plurality of colors from the image area based on the calculated feature amount; and substituting signal values of the pixel to be processed by new pixel values, which are calculated from the signal values of the pixel to be processed and signal values of the substitute candidate pixel.

According to still yet another aspect of the present invention, the foregoing problem is solved by providing an image processing method for applying an adjusting process to an image including multicolor image signals, comprising the steps of: extracting an image area including a pixel to be processed; generating one representative signal value from signal values corresponding to a plurality of colors of pixels included in the image area; calculating a feature amount associated with the pixel to be processed based on the representative signal value; selecting a substitute candidate pixel common to the plurality of colors from the image area based on the calculated feature amount; determining an edge direction based on the representative signal value in the image area; selecting a substitute candidate pixel from a pixel group included in the edge direction; and substituting signal values of the pixel to be processed by new pixel values, which are calculated from the signal values of the pixel to be processed and signal values of the substitute candidate pixel.

According to yet still another aspect of the present invention, the foregoing problem is solved by providing an image processing program for applying an adjusting process to an image including multicolor image signals, the program making a computer execute the steps of: extracting an image area including a pixel to be processed; generating one representative signal value from signal values corresponding to a plurality of colors of pixels included in the image area; calculating a feature amount associated with the pixel to be processed based on the representative signal value; selecting a substitute candidate pixel common to the plurality of colors from the image area based on the calculated feature amount; and substituting signal values of the pixel to be processed by new pixel values, which are calculated from the signal values of the pixel to be processed and signal values of the substitute candidate pixel.

According to still yet another aspect of the present invention, the foregoing problem is solved by providing an image processing program for applying an adjusting process to an image including multicolor image signals, the program making a computer execute the steps of: extracting an image area including a pixel to be processed; generating one representative signal value from signal values corresponding to a plurality of colors of pixels included in the image area; calculating a feature amount associated with the pixel to be processed based on the representative signal value; selecting a substitute candidate pixel common to the plurality of colors from the image area based on the calculated feature amount; determining an edge direction based on the representative signal value in the image area; selecting a substitute candidate pixel from a pixel group included in the edge direction; and substituting signal values of the pixel to be processed by new pixel values, which are calculated from the signal values of the pixel to be processed and signal values of the substitute candidate pixel.

Further features of the present invention will become apparent from the following description of exemplary embodiments with reference to the attached drawings.

BRIEF DESCRIPTION OF THE DRAWINGS

FIG. 3 is a flowchart of an image process of the MFP;

FIGS. 6A and 6B are explanatory views of the scan range of an image sensing element;

FIGS. 7A to 7F are graphs for explaining the luminance, and primary derivative, and secondary derivative;

FIG. 17 is a table for explaining an image with poor sharpness of an edge as a result of scanning;

FIG. 18 is a table showing the execution result of the embodiment;

FIG. 19 is a table showing an example of the edge emphasis result without using a representative value signal;

FIGS. 21A and 21B are explanatory views of edge emphasis filter coefficients.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of MFP>

Figure 1A:
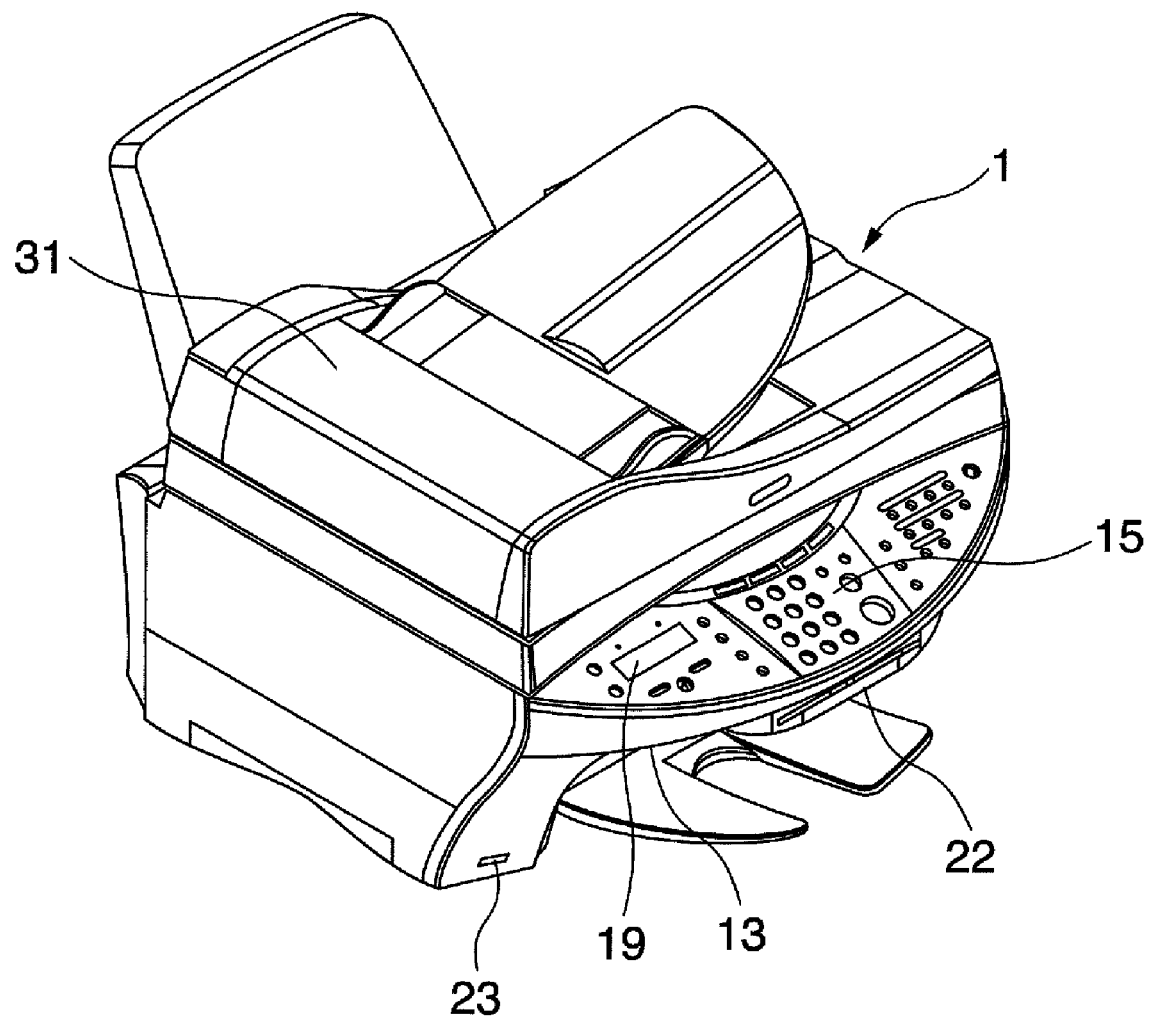
FIGS. 1A and 1B are explanatory views of an MFP.
Figure 1B:
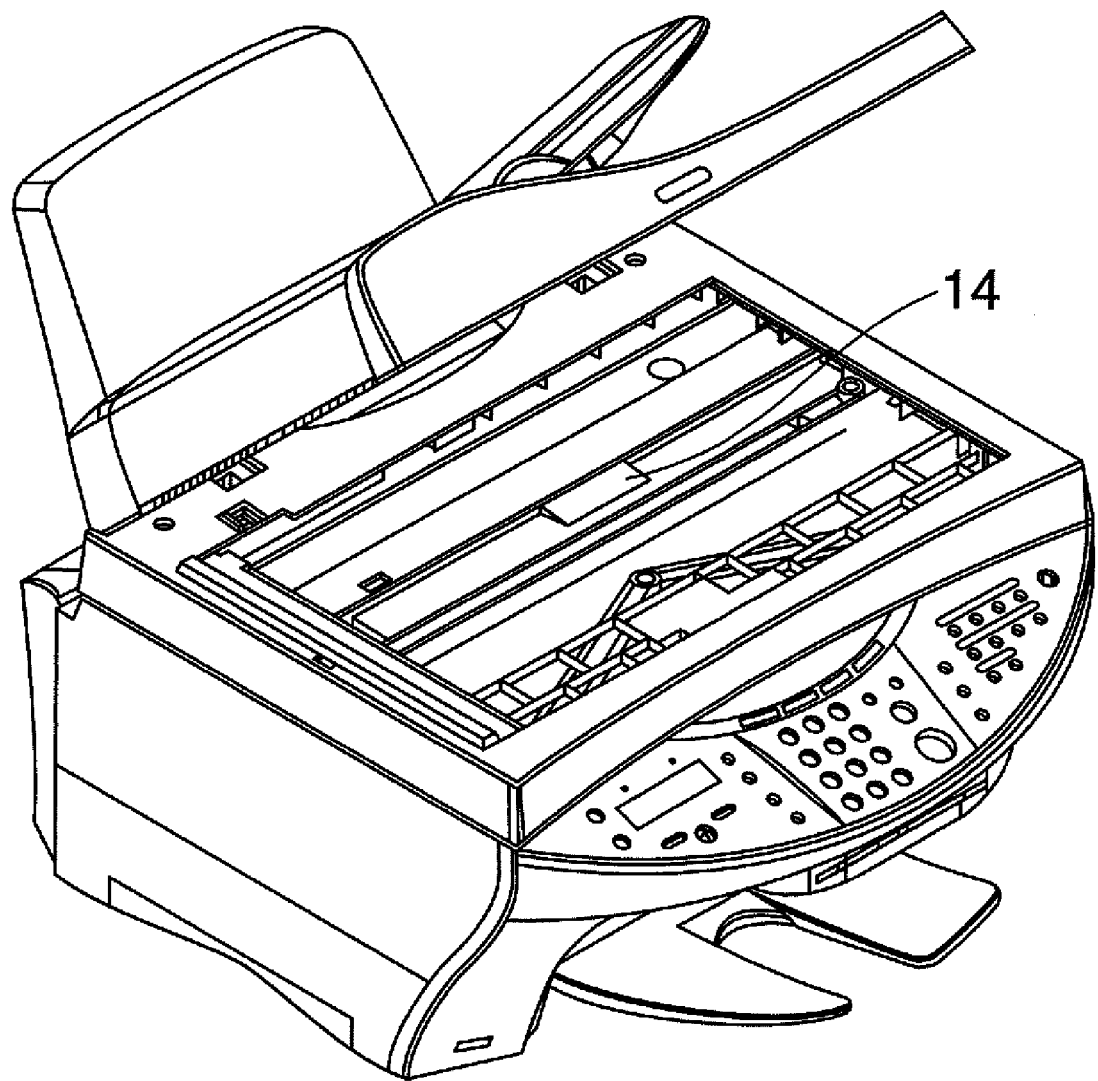

FIGS. 1A and 1B are schematic perspective views of a multi function printer (to be abbreviated as MFP hereinafter) 1 according to one embodiment of the present invention. FIG. 1A shows a state in which an ADF (auto document feeder) 31 of the MFP 1 is closed, and FIG. 1B shows a state in which the ADF 31 is open.

This MFP 1 basically has a function of printing data received from a host computer (PC) as a printer, and a function as a scanner. Furthermore, functions of the MFP alone include a copy function of printing an image scanned by the scanner using the printer, a function of printing image data read from a storage medium such as a memory card or the like, and a function of printing image data received from a digital camera or the like.

Referring to FIGS. 1A and 1B, the MFP 1 comprises a scanning unit 14 such as a flatbed scanner or the like, and a print unit 13 of an ink-jet system, electrophotography system, or the like. Also, the MFP 1 comprises a display unit 19 such as a display panel or the like, and an operation unit 15 including various key switches, and the like. The MFP 1 comprises a USB port (not shown) used to communicate with the PC on its back surface of the MFP 1, and the USB port allows the MFP 1 to communicate with the PC. The MFP 1 comprises a card interface 22 including a card slot used to read out data from various memory cards, and a camera interface 23 including a camera port used to make data communications with a digital camera. In addition, the MFP 1 comprises the ADF 31 used to automatically set a document on a document table.

Figure 2:
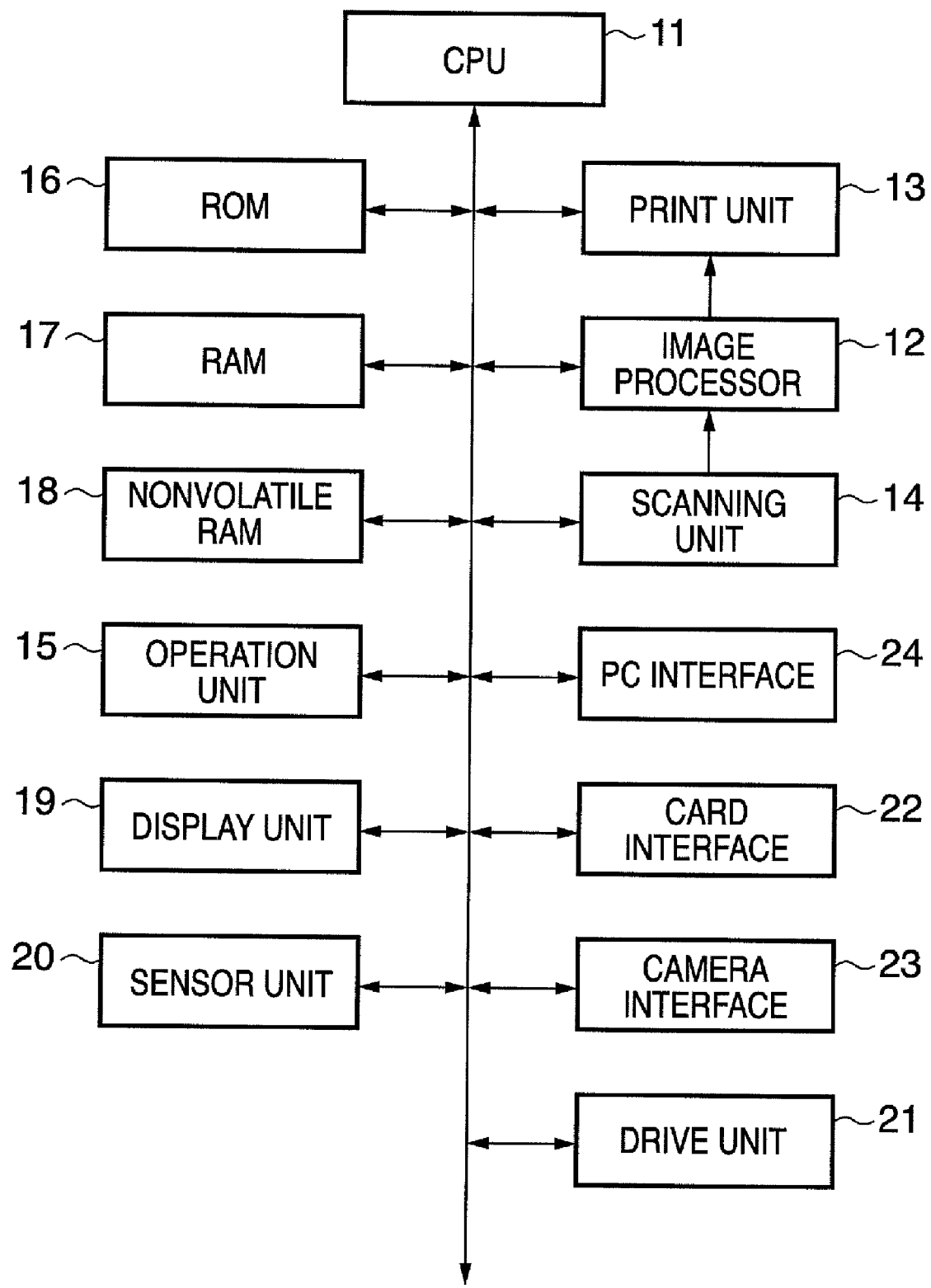
FIG. 2 is a block diagram for explaining the control arrangement of the MFP.

FIG. 2 is a block diagram showing the internal arrangement of the MFP 1. Referring to FIG. 2, a CPU 11 controls various functions of the MFP 1, and executes image process programs stored in a ROM 16 in accordance with predetermined operations at the operation unit 15. By executing the programs, the CPU 11 can select a pixel to be processed, and can extract an image area with a predetermined size including the pixel to be processed. The CPU 11 can calculate a variation, variation time count, and variation acceleration associated with a pixel to be processed based on signal values of pixels included in the image area. The ROM 16 stores various tables and mathematical formulas used in image processes, and serves as a defining unit which defines correspondence among the variation, variation time count, and variation acceleration, and various adjusting levels. The scanning unit 14 which comprises a CCD scans a document image, and outputs red (R), green (G), and blue (B) analog luminance data. Note that the scanning unit 14 may comprise a contact image sensor (CIS) in place of the CCD. Also, when the MFP 1 comprises the ADF 31, it is convenient to continuously scan order sheets.

The card interface 22 loads image data, which is captured by, e.g., a digital still camera (to be abbreviated as DSC hereinafter) and is recorded on a memory card or the like, in accordance with operations at the operation unit 15. Note that the color space of the image data loaded via the card interface 22 is converted from that (e.g., YCbCr) of the DSC into a standard RGB color space (e.g., NTSC-RGB or sRGB) if necessary. The loaded image data undergoes various kinds of processes required for an application such as resolution conversion to the effective number of pixels, and the like, based on its header information. The camera interface 23 is used to directly connect the DSC and to read image data.

An image processor 12 executes image processes such as conversion of a read signal value, an image adjusting/modification process, conversion from luminance signals (RGB) into density signals (CMYK), scaling, gamma conversion, error diffusion, and the like. The adjusting process to be executed by the image processor 12 includes an edge emphasis process, smoothing process, substitution process, achromatization process, and the like, and the image processor 12 serves as an adjusting unit. Data obtained by the image processes in the image processor 12 is stored in a RAM 17. When adjusted data stored in the RAM 17 reaches a predetermined amount, the print unit 13 executes a print operation.

A nonvolatile RAM 18 comprises, e.g., a battery backed-up SRAM or the like, and stores data unique to the MFP 1 or the like. The operation unit 15 comprises a photo direct print start key which allows the user to select image data stored in a storage medium (memory card) and to start printing. The operation unit 15 also comprises a key used to print an order sheet, a key used to scan an order sheet, and the like. The operation unit 15 may also comprise a copy start key in a monochrome copy mode or color copy mode, a mode key used to designate a mode such as a copy resolution, image quality, and the like, a stop key used to stop a copy operation or the like, a numerical keypad used to input a copy count, a registration key, and the like. The CPU 11 detects the pressing states of these keys and controls respective units according to the detected states.

The display unit 19 comprises a dot matrix type liquid crystal display unit (LCD) and an LCD driver, and makes various displays under the control of the CPU 11. Also, the display unit 19 displays thumbnails of image data recorded in a storage medium. The print unit 13 comprises an ink-jet head of an ink-jet system, general-purpose IC, and the like. The print unit 13 reads out print data stored in the RAM 17 and prints it out as a hard copy under the control of the CPU 11.

A drive unit 21 includes stepping motors for driving feed and discharge rollers, gears for transmitting the driving forces of the stepping motors, a driver circuit for controlling the stepping motors, and the like in order to operate the scanning unit 14 and print unit 15.

A sensor unit 20 includes a print sheet width sensor, print sheet sensor, document width sensor, document sensor, print medium sensor, and the like. The CPU 11 detects the states of a document and print sheet based on information obtained from this sensor unit 20.

A PC interface 24 is an interface with the PC, and the MFP 1 performs a print operation, scan operation, and the like from the PC via the PC interface 24. In a copy operation, image data scanned by the scanning unit 14 undergoes a data process inside the MFP, and is printed using the print unit 13.

Upon instruction of a copy operation from the operation unit 15, the scanning unit 14 scans a document set on the document table. The scanned data is sent to the image processor 12 and undergoes the image process. Then, the processed data is sent to the print unit 13, thus executing a print process.

<Image Process>
FIG. 3 is a flowchart of the image process executed in a copy mode. Respective steps will be described below. The CPU 11 applies shading correction to image data, which is scanned by the scanning unit 14 and is A/D-converted, so as to adjust variations of an image sensing element in STEP 301.

After that, the CPU 11 executes input device color conversion in STEP 302. As a result, the device-dependent color space of signal data is converted into a standard color space domain. For example, the standard color space includes sRGB specified by IEC (International Electrotechnical Commission). Also, AdobeRGB propounded by Adobe Systems Incorporated may be used. The conversion method includes an arithmetic method using a 3×3 or 3 ×9 matrix, a lookup table method which determines values based on a table that describes conversion rules, and the like.

In STEP 303, the CPU 11 applies an adjusting/modification process to the converted data. The process contents include an edge emphasis process that adjusts blurring due to scanning, a text modification process that improves legibility of text, a process for removing bleed-through that has occurred due to scanning upon light irradiation, and the like.

In STEP 304, the CPU 11 executes an enlargement/reduction process to convert the data to a desired scale when the user designates a zoom scale, in a 2-in-1 copy mode that assigns two document images on one sheet, or the like. As the conversion method, methods such as bicubic, nearest neighbor, and the like are generally used.

In STEP 305, the CPU 11 converts the data on the standard color space into signal data unique to an output device. The MFP according to this embodiment adopts an ink-jet system, and executes a conversion process into ink color data such as cyan, magenta, yellow, black, and the like. This conversion can use the same method as in STEP 302.

Furthermore, in STEP 306 the CPU 11 converts the data into the number of printable levels. For example, in case of binary expression, i.e., ON/OFF of ink dots, the data may be binarized by a quantization method such as error diffusion or the like. As a result, the data is converted into a data format that the printer can print, and a print operation is executed based on that data, thus forming an image.

Figure 4A:
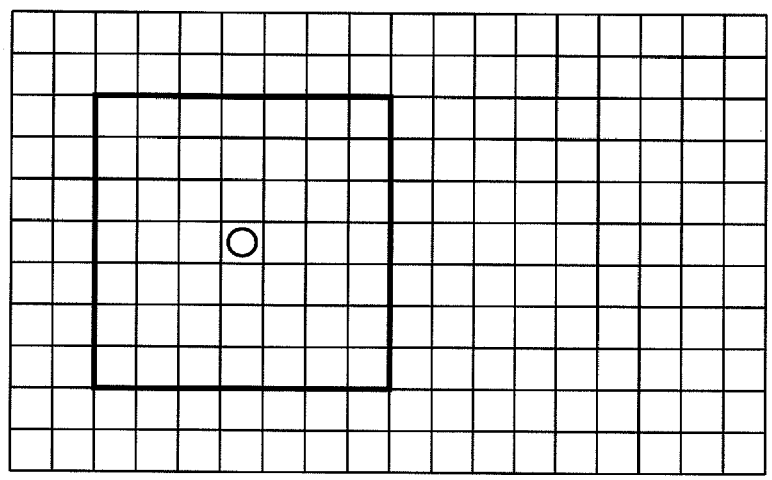
FIGS. 4A to 4C are explanatory views of a process unit.
Figure 4B:
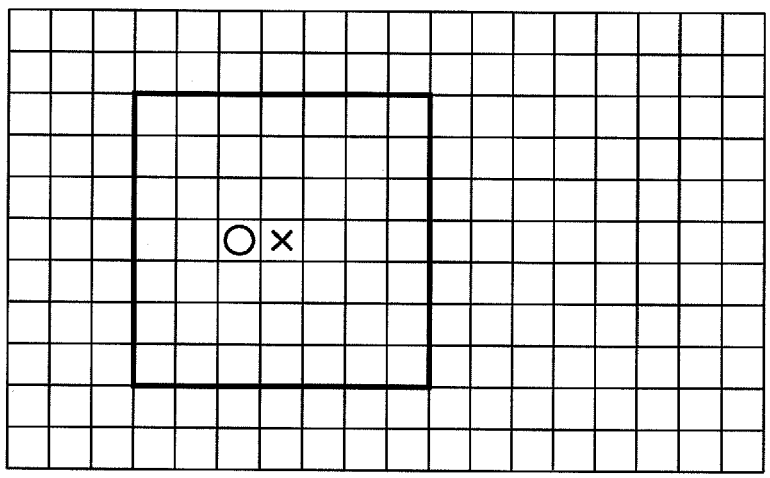

<Process Unit>
FIG. 4A is a view for explaining a process unit upon execution of an attribute determination process. Assuming that a pixel indicated by "circle" in FIG. 4A is a pixel of interest (pixel to be processed), an area defined by 7×7 pixels including the pixel of interest (7×7 area) is defined, as indicated by the bold line in FIG. 4A. An image process for the pixel of interest is executed using image signals in this defined 7×7 area. After execution of the process of the pixel of interest, a pixel that neighbors the pixel of interest is defined as the next pixel of interest, as indicated by "X" in, e.g., FIG. 4B, and a 7×7 area is similarly defined to execute the image process. After that, the pixel of interest is similarly shifted pixel by pixel in turn and a new 7×7 area is defined in each case, thus adjusting all pixels to be processed.

Figure 4C:
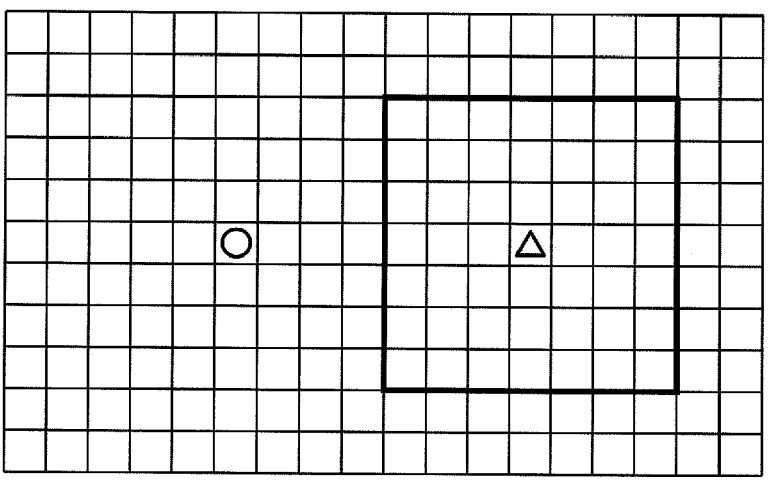

A case will be explained below wherein the process unit is an area unit. A 7×7 area is defined for a pixel indicated by "circle" in FIG. 4A, and an adjusting level to be defined for "circle" is applied to a plurality of pixels, e.g., all pixels, in the 7×7 area. As the next process unit, a 7×7 area is defined for a pixel indicated by "triangle" in FIG. 4C. In this way, the process unit is shifted, so that the 7 ×7 area for "circle" neighbors that for "triangle".

However, since the pixel unit is preferably used as the process unit to define the adjusting level at higher accuracy, the pixel unit will be described as the process unit in this embodiment.

Figure 5:
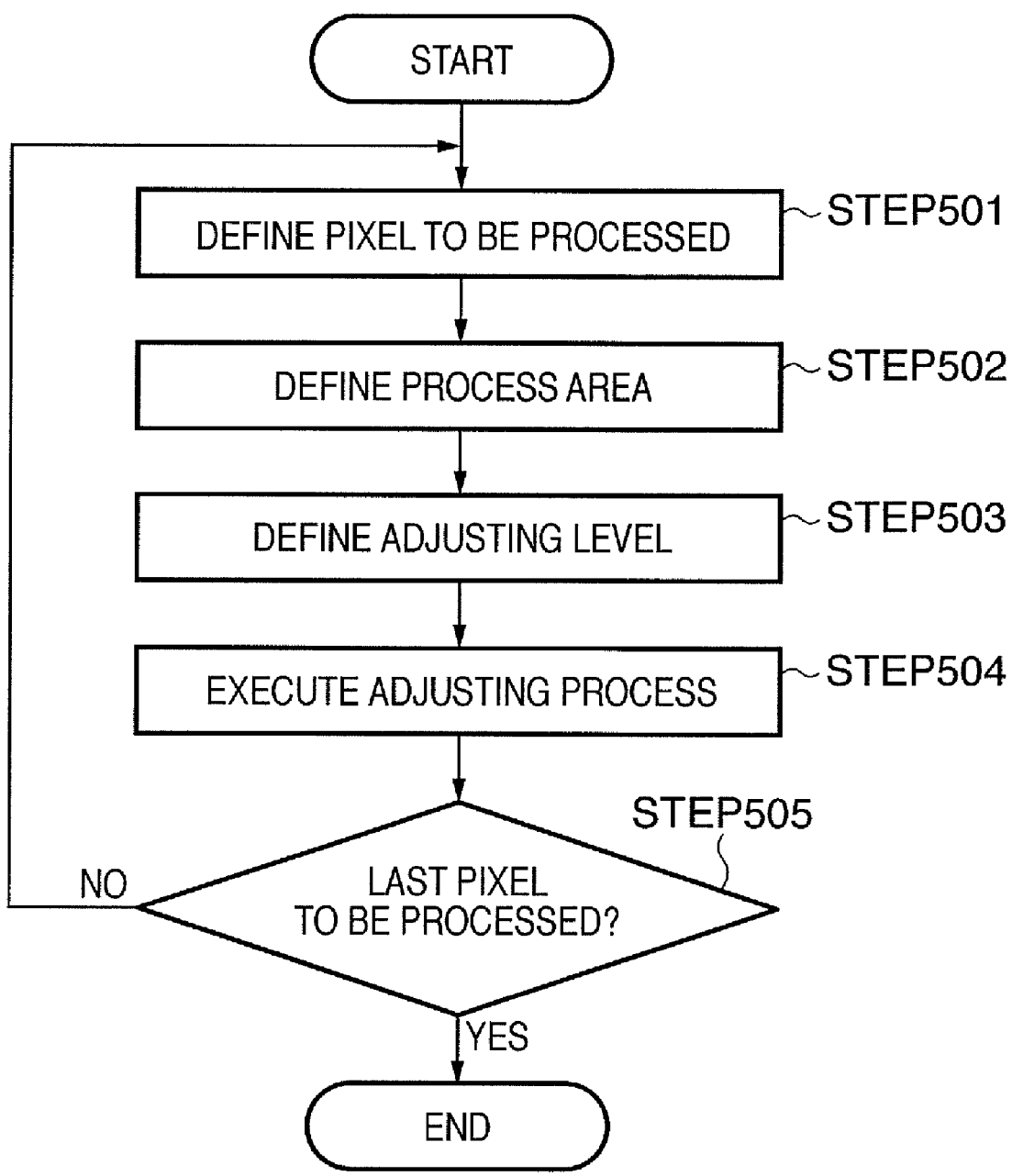
FIG. 5 is a flowchart of movement of a process unit.

FIG. 5 is a flowchart showing a shift procedure of the process unit. In STEP 501, the CPU 11 defines a process target (pixel to be processed). Immediately after START, the CPU 11 defines a first pixel to be processed. If the process returns from STEP 505 to STEP 501, the CPU 11 defines the next pixel to be processed.

STEP 502 is a process area defining step. The process area is an area configured by a plurality of pixels (7×7 area in the above description) including the process unit, as described above.

STEP 503 is an adjusting level defining step. The CPU 11 sets an adjusting level for the process unit.

STEP 504 is an adjusting execution step. The CPU 11 adjusts the process unit using the adjusting level defined in STEP 503.

STEP 505 is a last adjusting target checking step. That is, the CPU 11 checks if the process unit is the last one. If the process unit is not the last one (NO), the process returns to STEP 501. If the process unit is the last one (YES), the process reaches "END".

In the embodiments to be described hereinafter, the 7×7 area is used as the process area. This is because the pixel range of a document to be scanned by one pixel of the image sensing element (CCD or CIS) used in the scanning unit is designed to include six pixels or less. Although the pixel range to be scanned is designed to include six pixels or less, reflected light from a document that enters the image sensing element receives various influences due to float of a document from the document table, unevenness of a document, and the like. For this reason, one pixel of the image sensing element may scan a range exceeding six pixels. The embodiments to be described hereinafter show a plurality of graphs used to explain image signals obtained by scanning a document. However, these image signals are not always obtained from reflected light within six pixels or less.

FIGS. 6A and 6B simply illustrate the range of reflected light that comes from a document and enters one pixel of the image sensing element. As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of the related art, and deteriorates sharpness.

The embodiment to be described hereinafter aims at reducing blurring as one of its objects. An edge is emphasized by substituting the pixel of interest by a substitute candidate pixel. Hence, by selecting a substitute candidate from a pixel area less influenced by a document pixel corresponding to the pixel of interest, the edge emphasis effect can be enhanced. For this reason, an area which is influenced by one pixel of a document image is assured as the process area. Therefore, the 7×7 area is defined as the process area. In order to enhance the edge emphasis effect more, it is effective to set an area exceeding 7×7 pixels as a reference area. Also, when one pixel of the image sensing element is designed to receive reflected light from a 3-pixel range, as shown in FIG. 6B, the process area may be defined as small as a 3×3 area.

In order to reduce the process data size for the purpose of speeding up processes, an image is often scanned at a resolution lower than that of the image sensing element by decimating valid pixels, summing and integrating neighboring pixels, or the like. In such a case, it is effective to define an area smaller than the 7×7 area as a reference area. Conversely, when an image is scanned at a higher resolution, it is effective to define a process area to be larger than the 7×7 area.

In this manner, the reference area can be defined as needed in accordance with the performance of the image sensing element such as the number of pixels of the image sensing element influenced by one pixel of a document image, the spot size, the number of blurred pixels, Modulation Transfer Function (MTF), and the like.

<Definition of Terms>

Terms used in the present specification will be defined below.

A variation is a value that represents the magnitude of the variations of pixel signal values in a surrounding pixel group having a pixel to be processed as the center. In this embodiment, of the absolute values (edge amounts) of differences between luminance values of two pixels that neighbor one pixel on two sides, a maximum one will be explained as the variation. However, the present invention is not limited to such a specific value. For example, the variation may be a value that expresses the difference (magnitude) of changes such as the absolute value of the primary derivative of a value related to an image signal of a pixel of interest or the like, or a value that representatively expresses the difference (magnitude) of changes of values related to image signals in an area of interest.

A variation time count is a value that represents the frequency of occurrence of variations of image signal values in a surrounding pixel group having the pixel to be processed as the center. In this embodiment, the frequency of occurrence of increment/decrement of the difference between the luminance values of two pixels that neighbor one pixel on two sides in the image area (the number of sign changes (the number of zero-crossing points)) will be described as the variation time count. However, the present invention is not limited to such specific value.

The variation time count is defined as a value that expresses the frequency of occurrence of changes in value associated with image signals such as the number of zero-crossing points or spatial frequency of the primary derivatives of values associated with image signals in the image area, a black-white change count after binarization, and the like.

A variation acceleration is a value that represents the acceleration of variations of pixel signal values in a surrounding pixel group having the pixel to be processed as the center. In the following embodiment, the variation acceleration will be explained as a value obtained by further calculating a difference from the differences of luminance values in the image area. However, the present invention is not limited to such specific value. For example, the acceleration variation may be a value that expresses the acceleration of changes such as the secondary derivative of values associated with image signals in an area of interest and the like.

A saturation will be explained as a maximum absolute value of image signal differences of respective colors of a pixel or area of interest in the following embodiments. However, the present invention is not limited to such specific value. The saturation is defined as a value that expresses the distance from the chromaticity axis.

Adaptively defining an adjusting level is defined such that different adjusting levels are defined for each value in at least some value areas of those which the defined variation time count, variation, variation acceleration, and saturation can assume.

Details of the image processes of this embodiment will be described below. Note that a range from 0 to 255 that an image signal can assume will be exemplified. However, the range of the image signal is not limited to such specific one, and it may be defined to fit in the MFP or image processes.

Figure 14:
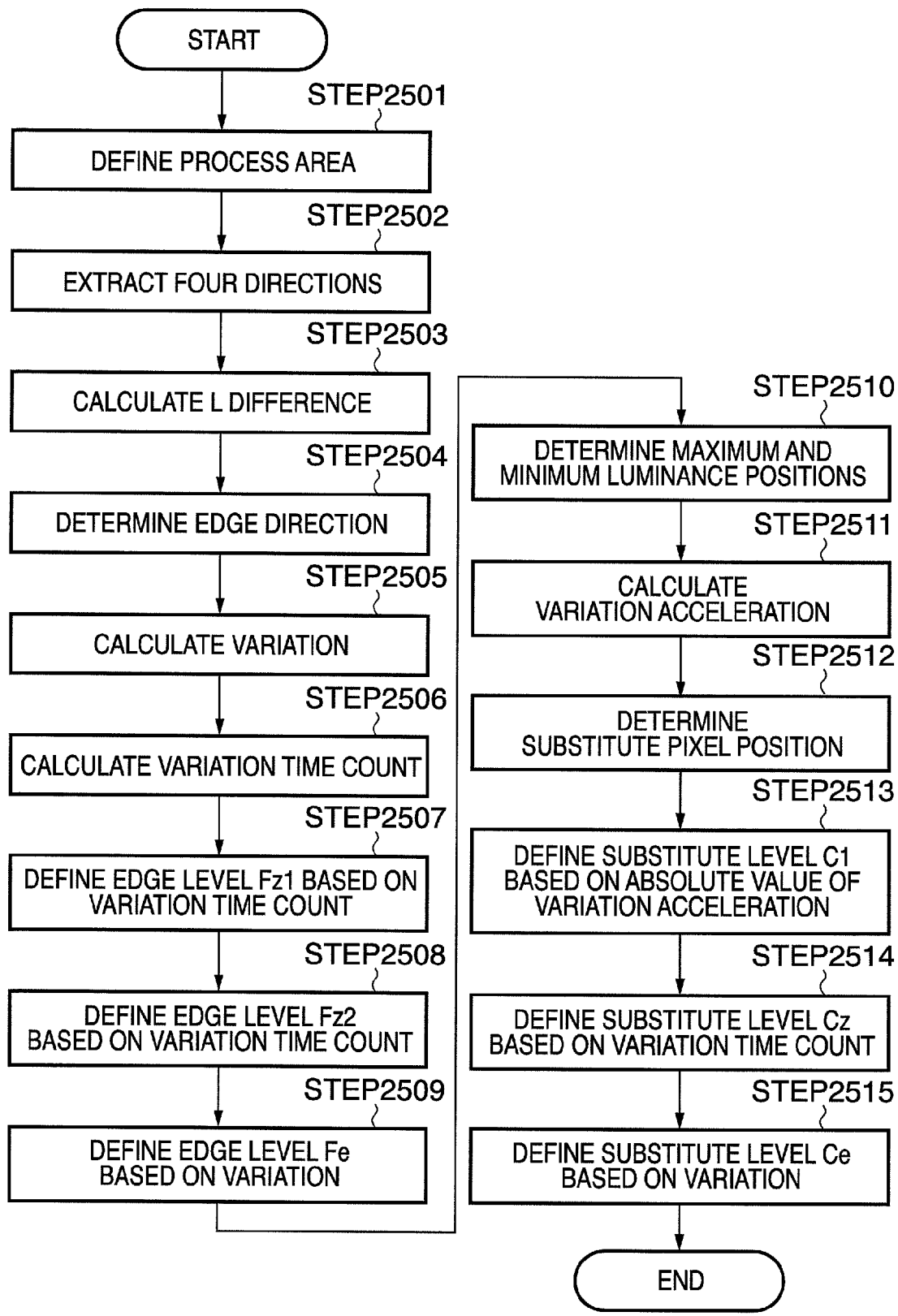
FIG. 14 is a flowchart of an adjusting level defining process according to the embodiment.

FIG. 14 is a flowchart of the adjusting level defining process according to this embodiment. The adjusting level defining process will be described below along respective steps of the flowchart.

<Adjusting Level Defining STEP 2501: Define Process Area>

The CPU 11 extracts a process area, i.e., a 7×7 area including seven pixels in the horizontal direction and seven pixels in the vertical direction to have the pixel of interest (the pixel to be processed) as the center in an image configured by RGB multi-valued image signals. The CPU 11 generates a 7×7 process area of luminance L by calculating luminance L from respective pixel values R, G, and B of the process area by:

$$L=(R+2\times G+B)/4 \quad (1)$$

Note that this embodiment uses luminance L given by equation (1), but may adapt another luminance. For example, image signals including lightness and color difference components may be selected, and L* of a uniform color space L*a*b* may be used as a luminance. Alternatively, Y of YCbCr may be used as a luminance, or only G of RGB may be extracted and used as L. In this manner, since the arithmetic volume can be reduced by selecting a specific color as the overall representative color, circuit implementation can be facilitated.

Figure 7A:
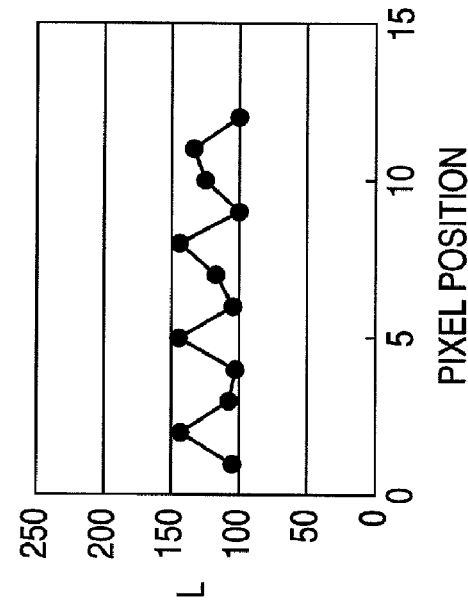
Figure 7B:
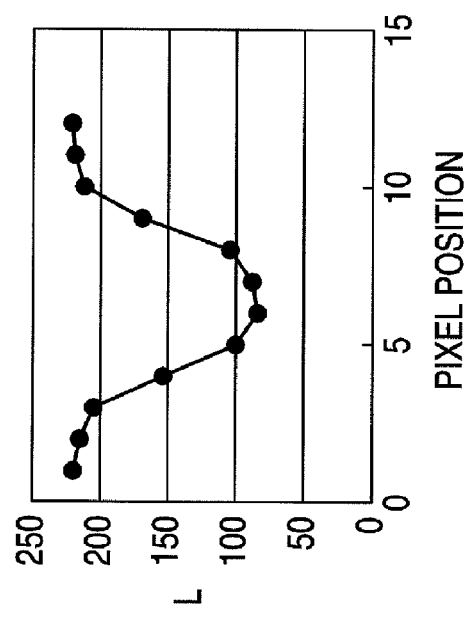

FIG. 7A shows luminance values upon scanning a black vertical line in a white background in the horizontal direction. FIG. 7B shows luminance values upon scanning halftone dots, that line up in the horizontal direction in a white background, in the horizontal direction.

<Adjusting Level Defining STEP 2502: Extract Four Directions>

Figure 8:
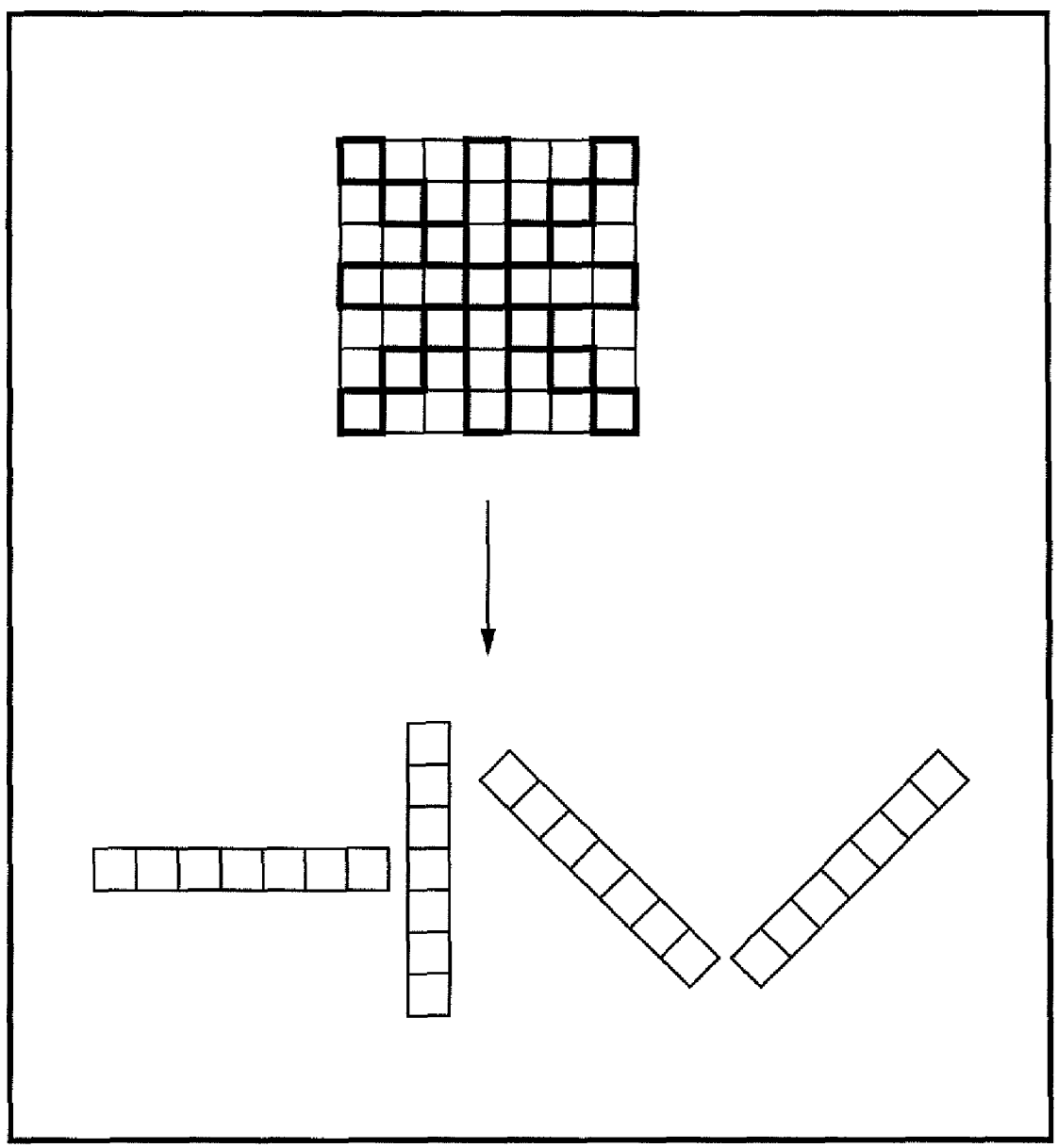
FIG. 8 is an explanatory view of 4-direction extraction.

The CPU 11 extracts, from the process area of L generated in STEP 2501, seven pixels in each of a total of four directions, i.e., one horizontal direction, one vertical direction, and two oblique directions, as shown in FIG. 8.

<Adjusting Level Defining STEP 2503: Calculate L Difference>

Figure 9:
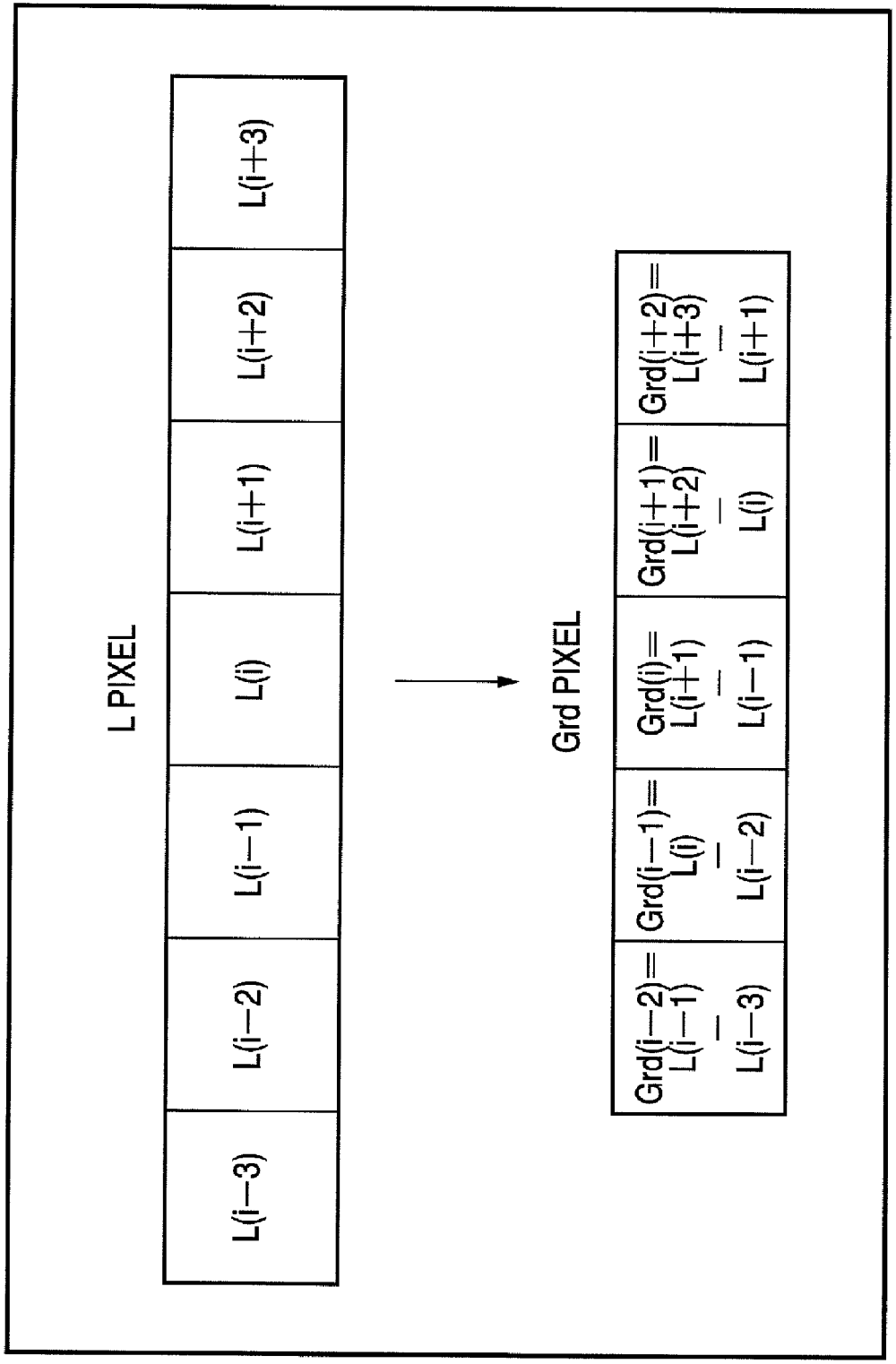
FIG. 9 is an explanatory view of an L difference.

The CPU 11 calculates, as feature amounts, differences Grd of L of five pixels in each direction from L in the four directions extracted in STEP 2502, as shown in FIG. 9, and using:

$$Grd(i)=L(i+1)-L(i-1) \quad (2)$$

Where L(i−1) is a pixel before pixel L(i), and L(i+1) is a pixel after pixel L(i).

Figure 7C:
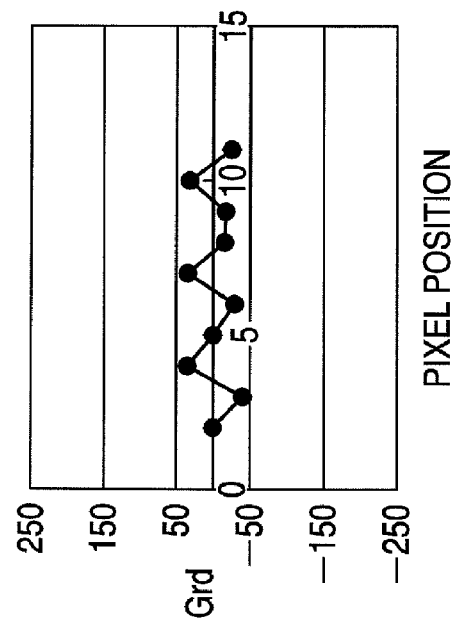
Figure 7D:
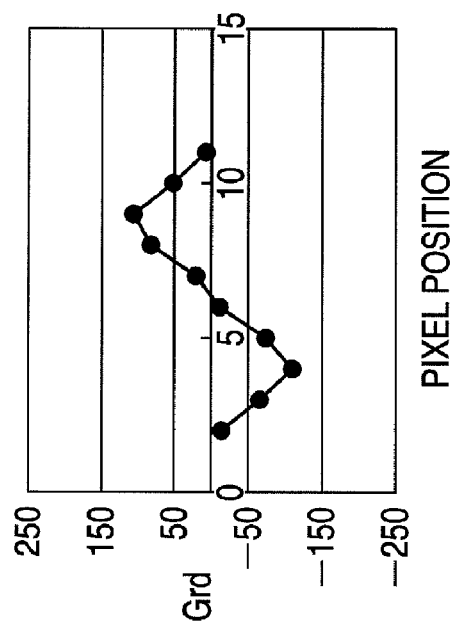

Equation (2) represents the primary derivative of digital signal values. Note that the L difference calculation method is not limited to such specific method. For example, differences between neighboring pixels may be calculated, or differences between pixels further separated from those before and after a given pixel described above may be calculated. FIGS. 7C and 7D show Grd calculated by applying equation (2) to L in FIGS. 7A and 7B.

<Adjusting Level Defining STEP 2504: Determine Edge Direction)

The CPU 11 calculates Grd absolute values in the four directions of the pixel of interest in Grd in the four directions calculated in STEP 2503. The CPU 11 determines a direction that shows a maximum Grd absolute value of those in the four directions as an edge direction of the pixel of interest.

<Adjusting Level Defining STEP 2505: Calculate Variation>

The CPU 11 can calculate Grd values for five pixels in STEP 2503 from seven pixels that line up in the edge direction determined in STEP 2504. The CPU 11 compares these Grd values for five pixels and calculates their maximum absolute value as a variation (edge amount) of the pixel of interest. An edge is stronger with increasing variation, and is close to flat with decreasing variation.

<Adjusting Level Defining STEP 2506: Calculate Variation Time Count>

Figure 10A:
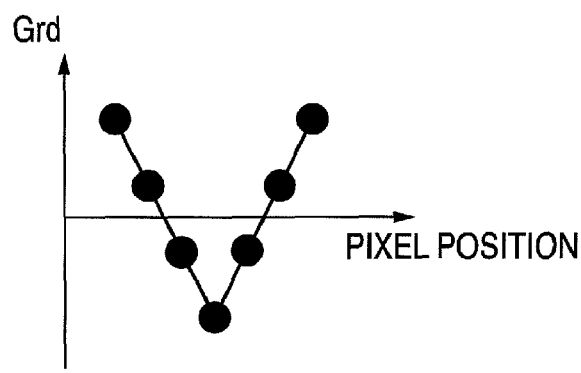
FIGS. 10A to 10D are graphs for explaining a variation time count.
Figure 10B:
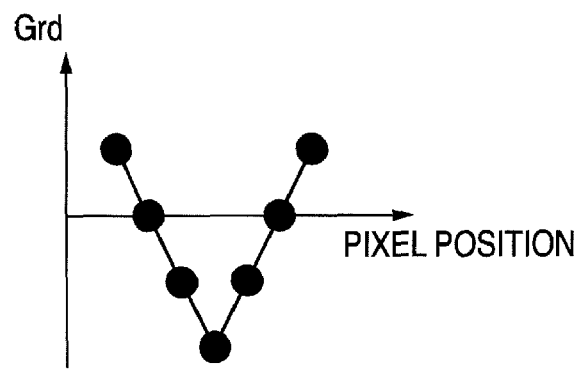

The CPU 11 calculates a variation time count as a total of the four directions from the Grd values in the four directions calculated in STEP 2503. That is, the CPU 11 calculates, as the variation time count (the number of zero-crossing points) of the pixel of interest, the number of change times of the sign of Grd from + to − or vice versa, as shown in FIG. 10A, or the number of change times of the sign of Grd from + to 0 and then to − at the next pixel, or from − to 0 and then to + at the next pixel, as shown in FIG. 10B.

Figure 10C:
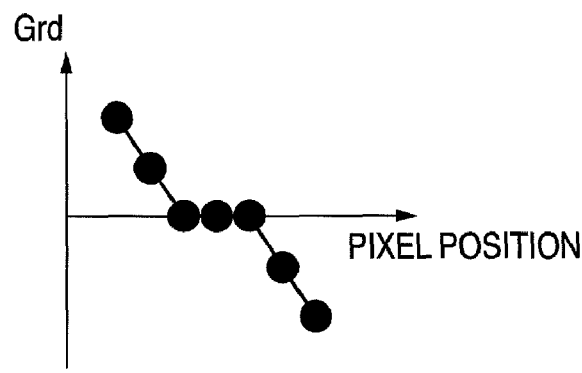
Figure 10D:
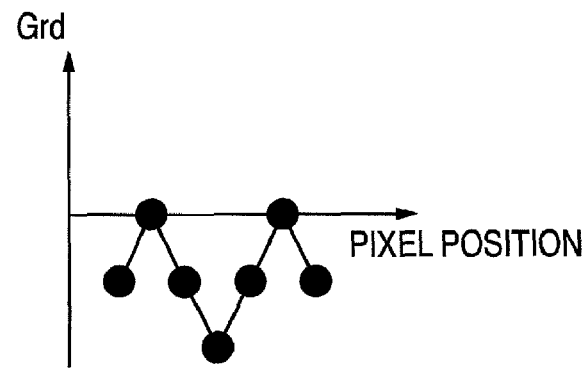

Note that this embodiment does not count, as the variation time count, a case in which the sign changes to sandwich zeros of a plurality of pixels, as shown in FIG. 10C, or a case in which the Grd value becomes zero but its sign does not change, as shown in FIG. 10D. The reason for this will be explained below. When the Grd values assume zero at the plurality of pixels or when the Grd values become zero but their sign does not change, a bold line is likely to be determined. As will be described in STEP 2508 and STEP 2703, a level different from that for a thin line in FIG. 10A or 10B can be defined for the bold line.

Figure 11A:
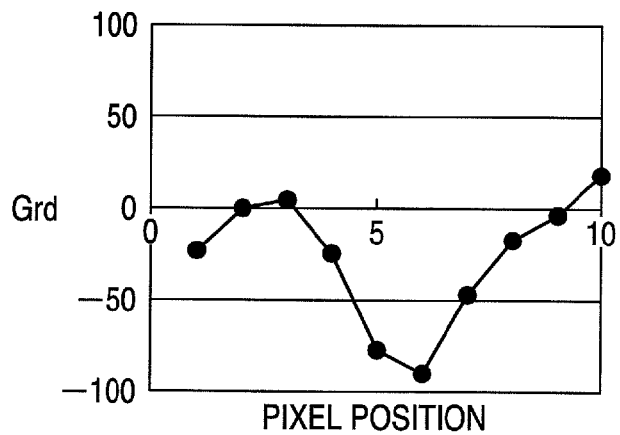
FIGS. 11A to 11C are graphs for explaining a variation time count adjusting process.
Figure 11B:
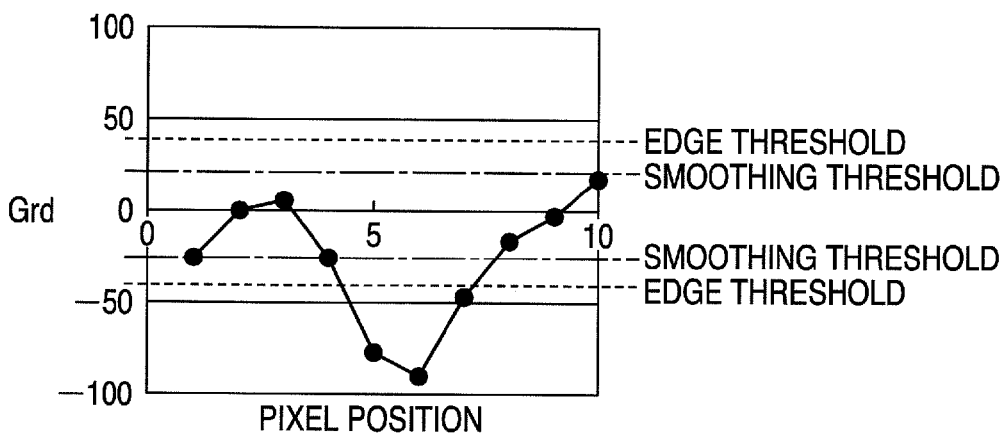
Figure 11C:
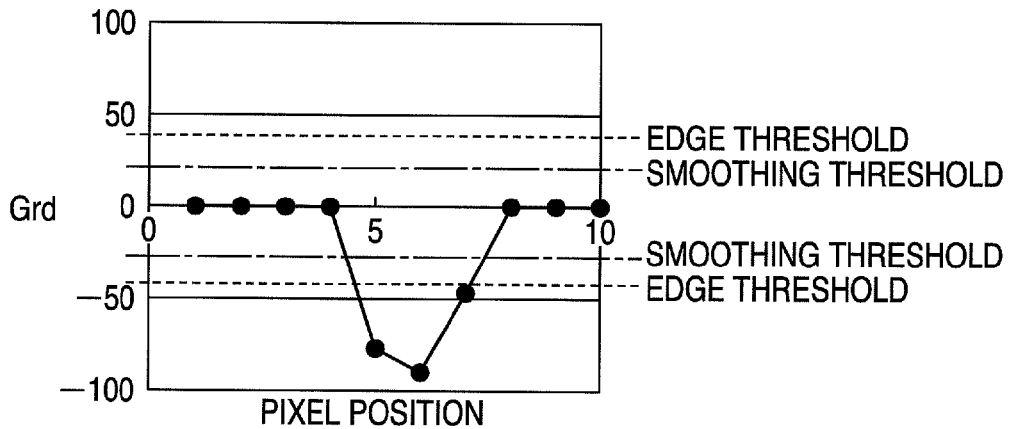

As shown in FIGS. 7A to 7F, text tends to have a smaller variation time count than halftone. However, depending on the density uniformity of a document or shading accuracy, text often has changes with small amplitudes in Grd, as shown in FIG. 11A. In such case, the variation time count increases like halftone, and if an adjusting level defining process (to be described later) is executed, an edge level close to that of halftone is undesirably defined. Hence, when the variation calculated in STEP 2505 is relatively large, i.e., when it exceeds a defined threshold, small Grd values are smoothed to zero to define an edge level with higher accuracy. More specifically, the variation calculated in STEP 2505 is compared with a threshold (edge threshold), and if the variation exceeds the edge threshold, a smoothing threshold is defined, as shown in FIG. 11B. In case of Grd absolute values equal to or smaller than the smoothing threshold, the variation time count is counted to have Grd=0, as shown in FIG. 11C. In this manner, the variation time count of text can be suppressed, and the edge level defining process with high accuracy can be attained.

<Adjusting Level Defining STEP 2507: Edge Level Defining Process 1 Based on Variation Time Count>

Figure 12A:
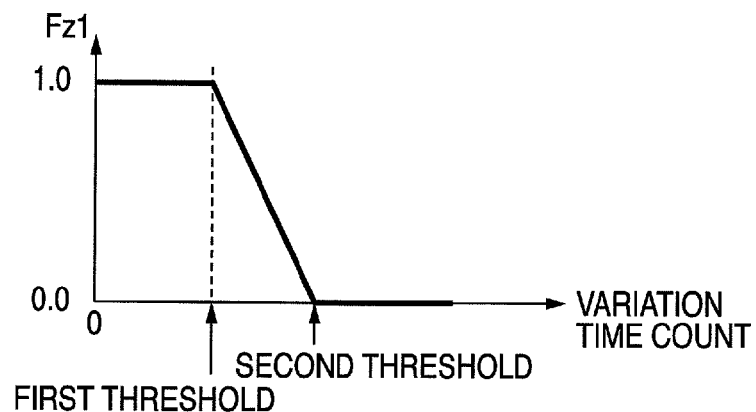
FIGS. 12A to 12D are graphs for explaining an edge level defining process.

The CPU 11 adaptively defines an edge level or magnitude Fz1 in accordance with the variation time count calculated in STEP 2506. FIG. 12A is a graph for explaining the Fz1 defining process in STEP 2507: the abscissa plots the variation time count, and the ordinate plots Fz1. In case of the variation time count which is smaller than a first threshold and with which a text area is more likely to be determined, Fz1 is defined to be 1 to emphasize the edge. In case of the variation time count which is larger than a second threshold and with which a halftone area that readily causes moiré at high LPI is more likely to be determined, Fz1 is defined to be 0 so as not to emphasize moiré. In case of the variation time count falling within a range between the first and second thresholds (both inclusive), Fz1 is adaptively defined to progressively change according to the variation time count, so that Fz1=1 when the variation time count=the first threshold and Fz1=0 when the variation time count=the second threshold. In this way, switching of the processes is obscured at the boundary of the edge-emphasized area and non-emphasized area. More specifically, the CPU 11 can adaptively define Fz1 with reference to FIG. 12A or using:

$$Fz1=(\text{second threshold}-\text{variation time count})/(\text{second threshold}-\text{first threshold}) \quad (3)$$

<Adjusting Level Defining STEP 2508: Edge Level Defining Process 2 Based on Variation Time Count>

Figure 12B:
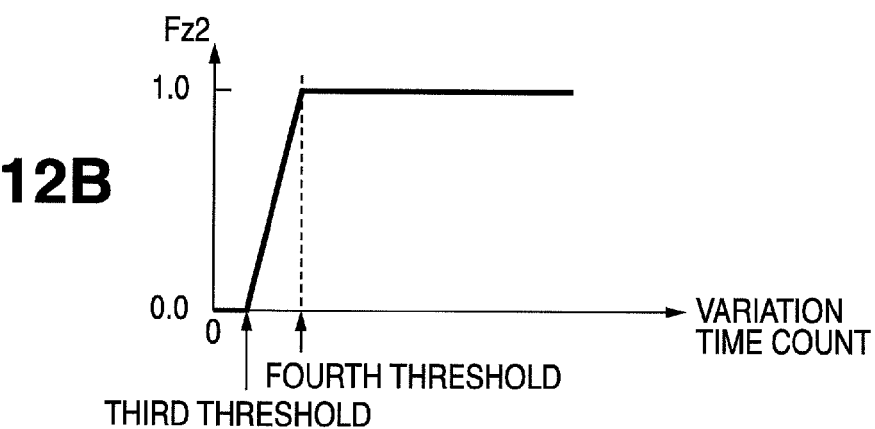

The CPU 11 adaptively defines an edge level Fz2 in accordance with the variation time count calculated in STEP 2506. FIG. 12B is a graph for explaining the Fz2 defining process in STEP 2508: the abscissa plots the variation time count, and the ordinate plots Fz2. FIG. 12B aims at attaining FIG. 12C when it is combined with FIG. 12A. As described in STEP 2506, when the variation time count is zero, a bold line area is more likely to be determined. When such bold line area undergoes edge emphasis using an edge emphasis filter (to be described later), bordering in which a border part of the bold line area darkens occurs. In order to prevent bordering, in case of the variation time count which is smaller than a third threshold and with which the bold line area is more likely to be determined, as shown in FIG. 12B, Fz2 is defined to be 0 to suppress edge emphasis. In case of the variation time count which is larger than a fourth threshold and with which a thin line area is more likely to be determined, Fz2 is defined to be 1 to apply edge emphasis. In case of the variation time count falling within a range between the third and fourth thresholds (both inclusive), Fz2 is adaptively defined to progressively change in accordance with the variation time count, so that Fz2=0 when the variation time count=the third threshold and Fz2=1 when the variation time count=the fourth threshold. As a result, switching of the processes can be obscured at the boundary between the edge-emphasized area and non-emphasized area by the filter. More specifically, the CPU 11 can adaptively define Fz2 with reference to FIG. 12B or using:

$$Fz2=(\text{variation time count}-\text{third threshold})/(\text{fourth threshold}-\text{third threshold}) \quad (4)$$

Figure 12C:
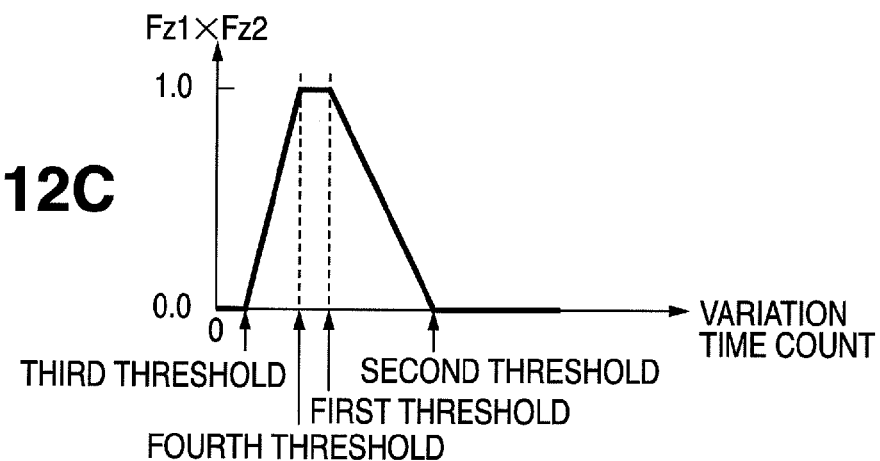

Fz1×Fz2 can implement the edge level shown in FIG. 12C. If bordering is required, Fz2=1 can be defined irrespective of the variation time count.

<Adjusting Level Defining STEP 2509: Edge Level Defining Process Based on Variation>

Figure 12D:
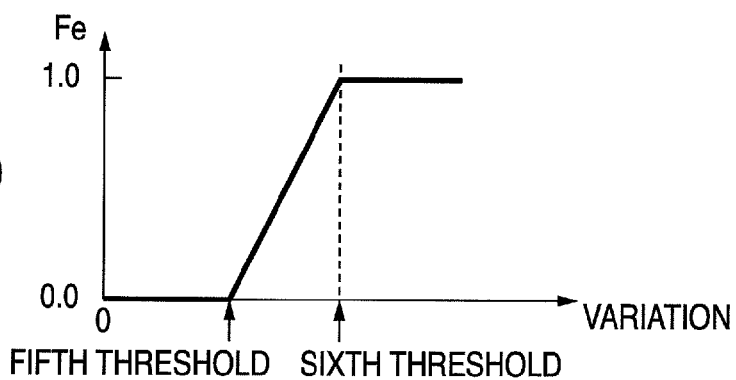

The CPU 11 adaptively defines an edge level Fe in accordance with the variation calculated in STEP 2505. FIG. 12D is a graph for explaining the Fe defining process in STEP 2509: the abscissa plots the variation, and the ordinate plots Fe. In case of the variation which is smaller than a fifth threshold and with which a flat area is more likely to be determined, Fe=0 is defined so as not to roughen an image by emphasizing small variations. In case of the variation which is smaller than a sixth threshold and with which an edge area is more likely to be determined, Fe=1 is defined to apply edge emphasis. In case of the variation falling within a range between the fifth and sixth thresholds (both inclusive), Fe is adaptively defined to progressively change according to a change in variation, so that Fe=0 when the variation=the fifth threshold and Fe=1 when the variation=the sixth threshold. As a result, switching of the processes can be obscured at the boundary between the edge-emphasized area and non-emphasized area. More specifically, the CPU 11 can adaptively define Fe with reference to FIG. 12D or using:

$$Fe=(\text{variation}-\text{fifth threshold})/(\text{sixth threshold}-\text{fifth threshold}) \quad (5)$$

<Adjusting Level Defining STEP 2510: Determine Maximum and Minimum Luminance Positions>

The CPU 11 determines pixel positions with maximum L and minimum L from seven pixels of L in the edge direction determined in STEP 2504 of the four directions extracted in STEP 2502.

<Adjusting Level Defining STEP 2511: Calculate Variation Acceleration>

The CPU 11 calculates a variation acceleration Lap of three pixels from Grd of the edge direction calculated in STEP 2503 in the edge direction determined in STEP 2504 as a feature amount associated with the extracted image area. The CPU 11 calculates the variation acceleration by:

$$Lap(i)=Grd(i+1)-Grd(i-1) \quad (15)$$

where Grd(i−1) is a pixel before pixel Grd(i), and Grd(i+1) is a pixel after that pixel. FIGS. 7E and 7F respectively show Lap calculated by applying equation (15) to Grd shown in FIGS. 7C and 7D.

Note that the calculation method of the variation acceleration is not limited to this. For example, a difference between neighboring Grd data may be calculated. Also, equation (15) expresses the secondary derivative of digital signal values.

<Adjusting Level Defining STEP 2512: Determine Substitute Pixel Position>

Figure 13A:
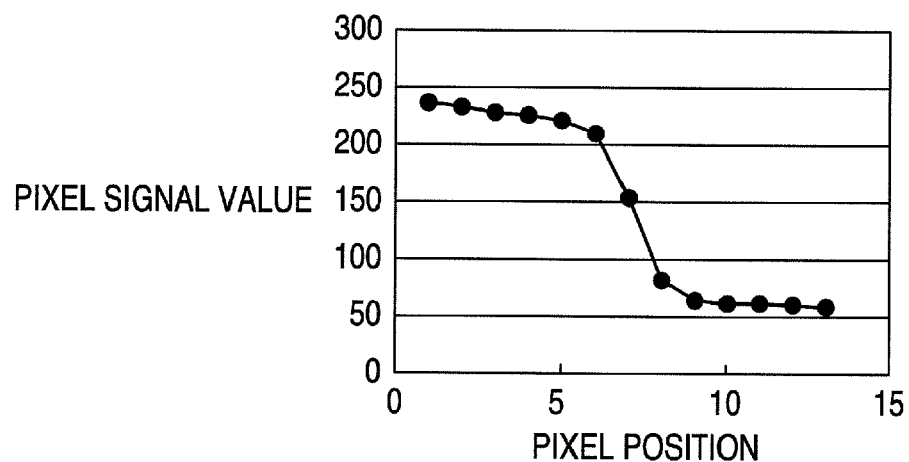
FIGS. 13A to 13C are graphs for explaining an edge emphasis process.
Figure 13B:
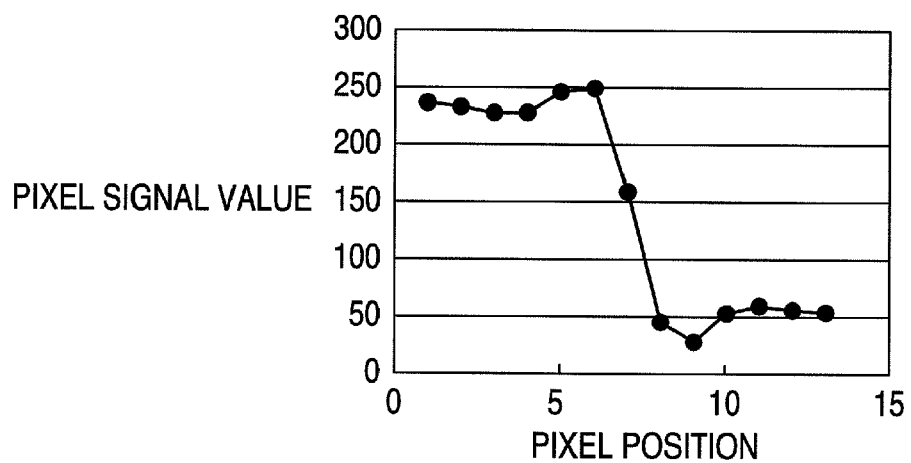
Figure 13C:
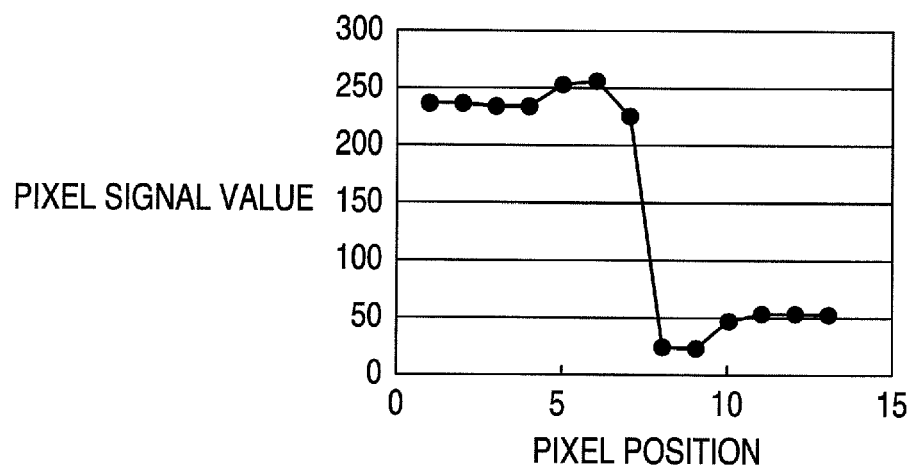

The CPU 11 determines a substitute pixel position based on the pixel positions with maximum L and minimum L determined in STEP 2510 and the variation accelerations Lap calculated in STEP 2511. As shown in FIGS. 7A to 7F, when the sign of Lap is +, L of the pixel of interest tends to assume a value, the absolute value of which is closer to minimum L than maximum L; when the sign of Lap is −, L of the pixel of interest tends to assume a value, the absolute value of which is closer to maximum L than minimum L. Hence, when the CPU 11 determines a substitute pixel position with respect to the sign of Lap to substitute the pixel position, as shown in Table 1 below, image signal values shown in FIG. 13A can be adjusted, as shown in FIG. 13C.

If a maximum value is always selected when Lap=0, an edge always becomes thin; if a minimum value is always selected, an edge always becomes bold. To solve such problem, the Lap values of pixels before and after the pixel of interest are totaled, and a substitute candidate pixel is determined based on the sign of the total.

TABLE 1

Relationship between secondary derivative sign and substitute pixel position

| Lap Sign of Pixel of Interest | Total Lap Sign of Previous and Next Pixels | Substitute Pixel Position |
|---|---|---|
| + | | Minimum L |
| − | | Maximum L |
| 0 | + | Minimum L |
| 0 | − | Maximum L |
| 0 | 0 | Maximum L |

<Adjusting Level Defining STEP 2513: Define Substitute Level based on Absolute Value of Variation Acceleration>

The CPU 11 adaptively defines a substitute level C1 in accordance with the absolute value of the variable acceleration calculated in STEP 2511. FIG. 13C can be obtained by defining C1=1 irrespective of the absolute value of the variation acceleration. However, if C1=1 is always defined, jaggy often stands out. Hence, a substation example that can suppress jaggy and can emphasize an edge more than FIG. 13B will be explained.

Figure 15A:
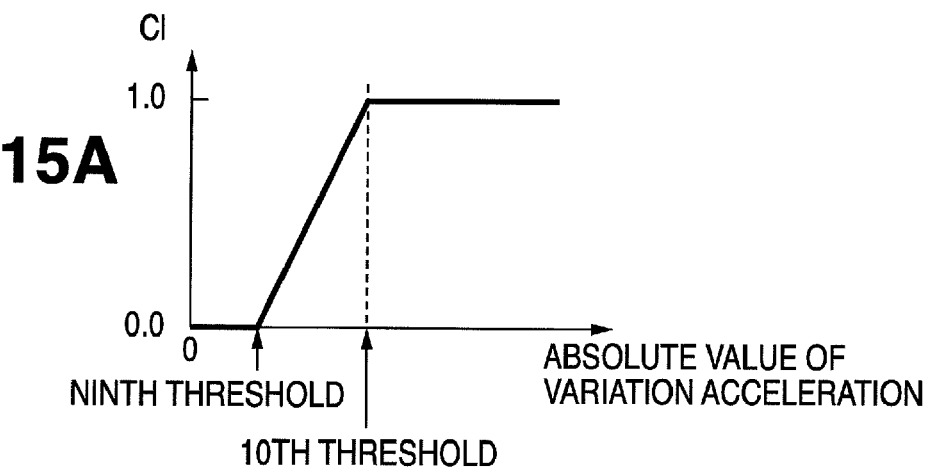
FIGS. 15A to 15C are graphs for explaining a substitute level defining process.

FIG. 15A is a graph for explaining the C1 defining process in STEP 2513: the abscissa plots the absolute value of the variation acceleration, and the ordinate plots C1. In case of the variation acceleration which is near the edge center and is smaller than a ninth threshold, C1 is defined to be zero so as not to substitute the pixel position. The reason why the pixel position near the edge center is not substituted is to obscure generation of jaggy. In case of the absolute value of the variation acceleration which is separated away from the edge center and is larger than a 10th threshold, C1 is defined to be 1 to substitute the pixel position. In case of the absolute value of the variation acceleration falling within the range between the ninth and 10th thresholds (both inclusive), C1, which progressively changes for respective absolute values of the variation accelerations, is adaptively defined, so that C1=0 when the absolute value of the variation acceleration=the ninth threshold and C1=1 when the absolute value of the variation acceleration=the 10th threshold. As a result, switching of the processes can be obscured. More specifically, the CPU 11 can adaptively define C1 with reference to FIG. 15A or using:

$$C1 = (\text{absolute value of variation acceleration} - \text{ninth threshold})/(\text{10th threshold} - \text{ninth threshold}) \quad (16)$$

<Adjusting Level Defining STEP 2514: Define Substitute Level based on Variation Time Count>

Figure 15B:
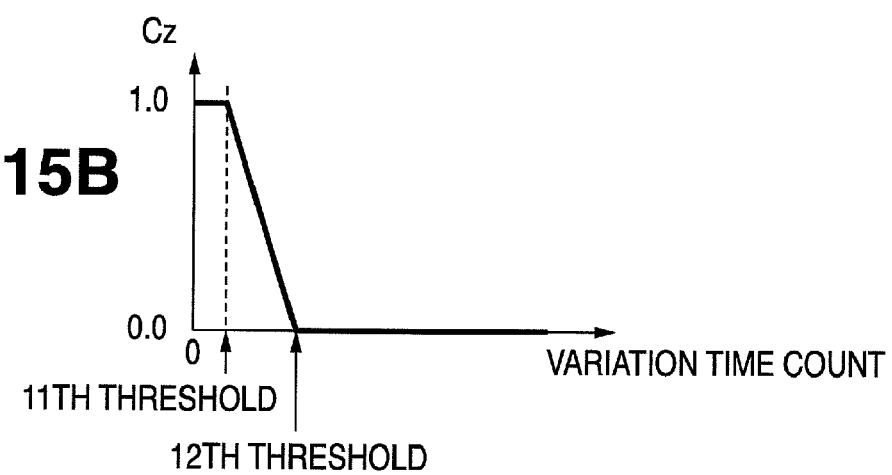

The CPU 11 adaptively defines a substitute level Cz in accordance with the variation time count calculated in STEP 2506. The CPU 11 adaptively defines Cz based on characteristics shown in FIG. 15B using 11th and 12th thresholds, as in STEP 2507. In case of a bold line area, the variation time count of which is smaller than the 11th threshold, Cz=1. In case of a thin line or halftone area, the variation time count of which is larger than the 12th threshold, Cz=0. In case of the variation time count falling within the range between the 11th and 12th thresholds (both inclusive), the CPU 11 can adaptively define Cz using:

$$Cz = (\text{12th threshold} - \text{variation time count})/(\text{12th threshold} - \text{11th threshold}) \quad (17)$$

<Adjusting Level Defining STEP 2515: Define Substitute Level based on Variation>

Figure 15C:
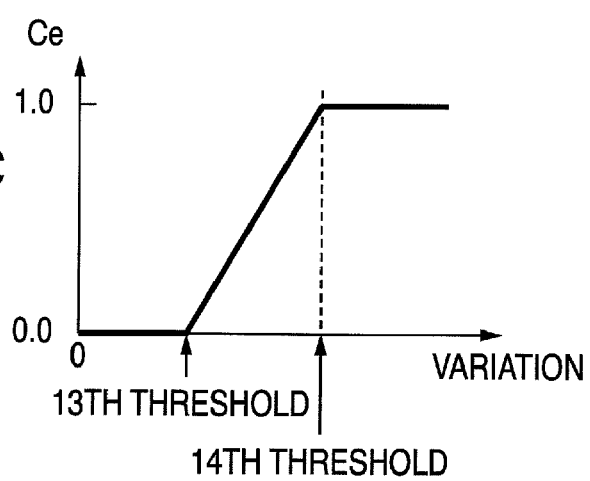

The CPU 11 adaptively defines a substitute level Ce in accordance with the variation calculated in STEP 2505. The CPU 11 adaptively defines Ce based on characteristics shown in FIG. 15C using 13th and 14th thresholds as in STEP 2509. If the variation is smaller than the 13th threshold, Ce=0. If the variation is larger than the 14th threshold, Ce=1. If the variation falls within the range between the 13th and 14th thresholds (both inclusive), the CPU 11 can adaptively define Ce using:

$$Ce = (\text{variation} - \text{13th threshold})/(\text{14th threshold} - \text{13th threshold}) \quad (18)$$

Figure 16:
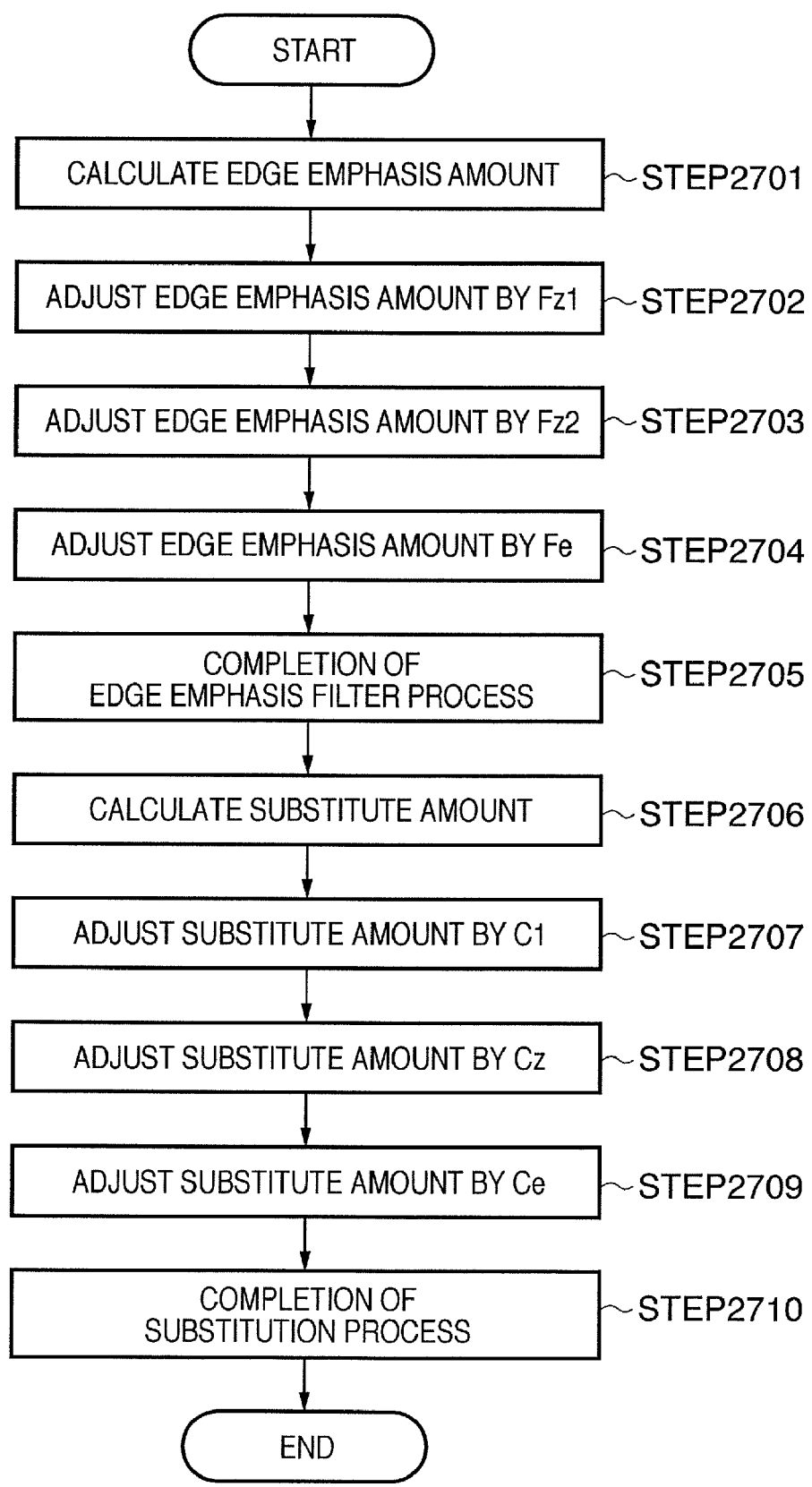
FIG. 16 is a flowchart of an adjusting process according to the embodiment.

FIG. 16 is a flowchart of the adjusting process according to the first embodiment. The adjusting process will be described below along respective steps of the flowchart.

<Adjusting Process STEP 2701: Calculate Edge Emphasis Amount>

The CPU 11 calculates differences (edge emphasis amounts) between the pixel value of interest upon applying an edge emphasis filter and that before application for respective colors in the 7×7 RGB areas defined in STEP 2501. This embodiment will exemplify a case in which a 5×5 edge emphasis filter is applied to have the pixel of interest as the center. However, the filter size need only be smaller than the process area size defined in STEP 2501, and filter coefficients may be appropriately defined. FIG. 21A shows an example of filter coefficients of a 5×5 edge emphasis filter. Let N0 be a pixel value of interest, N1 be a pixel value of interest as a result of application of the filter in FIG. 21A, and ΔF be an edge emphasis amount. The CPU 11 can calculate ΔF by:

$$\Delta F = N1 - N0 \quad (24)$$

As shown in FIG. 21B, when the filter coefficient of the pixel of interest is defined to be a value obtained by subtracting the filter total value in FIG. 21A from the filter coefficient at the position of the pixel of interest in FIG. 21A, ΔF can be calculated by only applying FIG. 21B.

<Adjusting Process STEP 2702: Adjust Edge Emphasis Amount by Fz1>

The CPU 11 adjusts the edge emphasis amount ΔF calculated in STEP 2701 using the edge level Fz1 defined in STEP 2507. The CPU 11 calculates an adjusted edge emphasis amount ΔFz1 using:

$$\Delta Fz1 = Fz1 \times \Delta F \quad (25)$$

By the process in STEP 2702, a text area with a small variation time count can undergo relatively strong edge emphasis, and a halftone area with a large variation time count can undergo relatively weak edge emphasis. Hence, the sharpness of text can be enhanced, and moiré can be prevented from being emphasized at the same time.

<Adjusting Process STEP 2703: Adjust Edge Emphasis Amount by Fz2>

The CPU 11 adjusts the edge emphasis amount ΔFz1 calculated in STEP 2702 using the edge level Fz2 defined in STEP 2508. The CPU 11 calculates an adjusted edge emphasis amount ΔFz2 using:

$$\Delta Fz2 = Fz2 \times \Delta Fz1 \quad (26)$$

When Fz2 is defined, as shown in FIG. 12B, the process in STEP 2703 can apply edge emphasis to the bold line area to prevent bordering, and can apply stronger edge emphasis to the thin line area than the bold line area to enhance the sharpness and increase the density of a black character.

<Adjusting Process STEP 2704: Adjust Edge Emphasis Amount by Fe>

The CPU 11 adjusts the edge emphasis amount ΔFz2 calculated in STEP 2703 using the edge level Fe defined in STEP 2509. The CPU 11 calculates an adjusted edge emphasis amount ΔFe using:

$$\Delta Fe = Fe \times \Delta Fz2 \quad (27)$$

By the process in STEP 2704, the edge area such as a character can undergo relatively strong edge emphasis, and the flat area such as a background or photo can undergo relatively weak edge emphasis. As a result, the sharpness of a character can be enhanced, moiré can be prevented from being emphasized, and a photo can be prevented from being roughened at the same time.

<Adjusting Process STEP 2705: Completion of Edge Emphasis Filter Process>

The CPU 11 calculates an edge emphasis filter process pixel value Ne by adding the edge emphasis amount ΔFe calculated in STEP 2704 to the pixel value N0 of interest, as given by:

$$Ne = N0 + \Delta Fe \quad (28)$$

Note that a process for clipping Ne within a desired range may be inserted.

<Adjusting Process STEP 2706: Calculate Substitute Amount>

The CPU 11 calculates a substitute amount using the pixel value at the substitute pixel position determined in STEP 2512. The CPU 11 extracts RGB values at the substitute pixel position determined in STEP 2512 from the 7×7 RGB areas defined in STEP 2501. Let N0 be the pixel value of interest, C0 be the pixel value at the substitute pixel position, and ΔC be the substitute amount. Then, the CPU 11 can calculate ΔC using:

$$\Delta C = C0 - N0 \qquad (19)$$

<Adjusting Process STEP 2707: Adjust Substitute Amount by C1>

The CPU 11 adjusts the substitute amount ΔC calculated in STEP 2706 by the substitute level C1 defined in STEP 2513. The CPU 11 calculates an adjusted substitute amount ΔC1 using:

$$\Delta C1 = C1 \times \Delta C \qquad (20)$$

By the process in STEP 2707, the substitution that suppresses generation of jaggy can be applied.

<Adjusting Process STEP 2708: Adjust Substitute Amount by Cz>

The CPU 11 adjusts the substitute amount ΔC1 calculated in STEP 2707 by the substitute level Cz defined in STEP 2514. The CPU 11 calculates an adjusted substitute amount ΔCz using:

$$\Delta Cz = Cz \times \Delta C1 \qquad (21)$$

By the process in STEP 2708, the substitution that can suppress generation of jaggy can be applied by strengthening the substitute level for the bold line area, and by weakening that for the thin line area.

<Adjusting Process STEP 2709: Adjust Substitute Amount by Ce>

The CPU 11 adjusts the substitute amount ΔCz calculated in STEP 2708 by the substitute level Ce defined in STEP 2515. The CPU 11 calculates an adjusted substitute amount ΔCe using:

$$\Delta Ce = Ce \times \Delta Cz \qquad (22)$$

By the process in STEP 2709, an edge area of a character or the like is relatively strongly substituted to enhance sharpness, and a flat area is relatively weakly substituted to prevent roughening.

<Adjusting Process STEP 2710: Completion of Substitution Process>

The CPU 11 calculates a pixel value Nc of interest edge-emphasized by means of filtering and substitution according to the present invention by adding the substitute amount ΔCe calculated in STEP 2709 to the edge emphasis filter-processed value Ne of the pixel of interest, as given by:

$$Nc = Ne + \Delta Ce \qquad (23)$$

Note that a process for clipping Nc within a desired range may be inserted.

<Effects of Embodiment>

According to this embodiment, since emphasis is applied using substitution, emphasis free from bordering can be executed while assuring a sharp edge.

Since the edge direction is determined based on the primary derivative of representative values, a substitute candidate pixel can always be selected from a correct edge direction, and edge emphasis can be effectively applied. Since the substitute pixel position can be determined using the sign of the primary derivative, a pixel with an appropriate luminance value can be selected according to surrounding luminance values L, and edge emphasis can be effectively applied. When the secondary derivative is "0", since the substitute candidate pixel position is determined with reference to the secondary derivative values of pixels before and after the pixel of interest, edge emphasis can be effectively applied. Since the edge direction is determined from four directions, pixels other than those in the four directions need not be referred to, thus simplifying the processes. This effect becomes more conspicuous with increasing reference area size.

Figure 20:
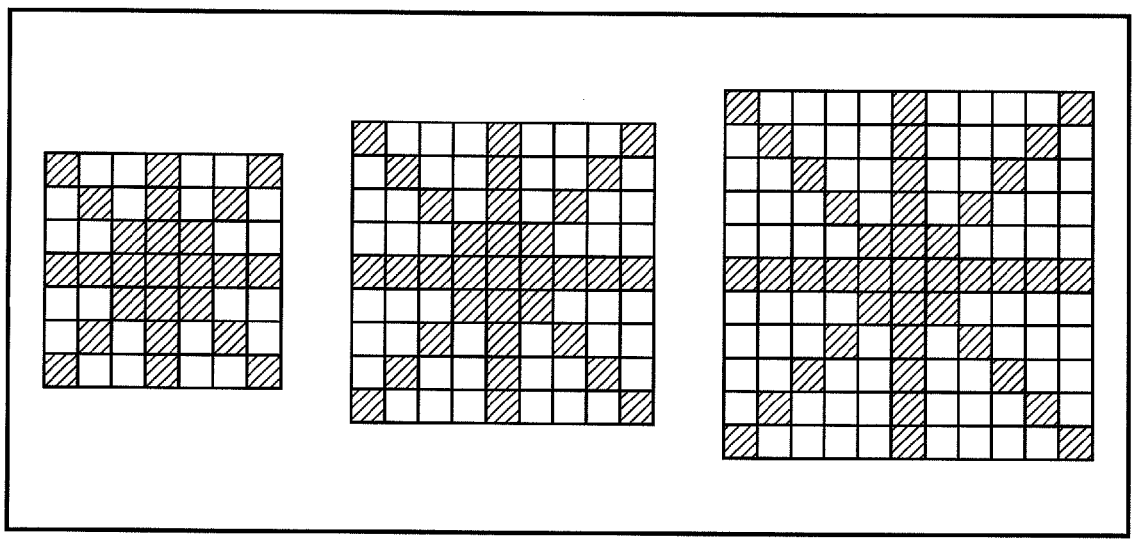
FIG. 20 is an explanatory view of four directions when a reference area is changed.

As shown in FIG. 20, in case of a 7×7 reference area, 25 out of 49 pixels are included in the four directions. In case of a 9×9 reference area, 33 out of 81 pixels are included in the four directions. Also, in case of an 11×11 reference area, 41 out of 121 pixels are included in the four directions. That is, in case of a (2n+1)×(2n+1) reference area, (8n+1) out of (2n+1)×(2n+1) pixels are included in the four directions. Hence, the effect of process simplification owing to needlessness of reference to pixels other than those in the four directions is enhanced more with increasing n. Upon scanning using the same optical system, the edge blurred amount often increases with increasing resolution. Hence, in such case, the reference area size must be increased. Therefore, this effect is larger with increasing resolution. Since the edge direction is determined, and the variation acceleration in only the edge direction is then calculated, variation accelerations other than that in the edge direction need not be calculated, resulting in simple processes.

Also, the following effect can be provided. FIG. 17 expresses an image with gradation from blue on the left side to yellow on the right side. Each box represents a pixel, and three numerical values in that box represent R, G, and B signal values. For example, "0, 0, 240" means R=0, G=0, and B=240, and indicates a blue pixel. An intermediate part from blue on the left side to yellow on the right side has intermediate colors from blue to yellow, and illustrates a blurred state due to optical scanning.

FIG. 18 expresses an image obtained by applying this embodiment to the image shown in FIG. 17 while the adjusting levels are always set to be Cl=Cz=Ce=1. The left half is blue, the right half is yellow, and there is no intermediate color part. As can be seen from FIG. 18, blurs caused by optical scanning can be adjusted, thus enhancing the sharpness.

FIG. 19 expresses an image obtained by independently executing determination and substitution of the substitute pixel positions for R, G, and B signals while the adjusting levels are always set to be Cl=Cz=Ce=1 and no L signal is generated. The left side is blue, and the right side is yellow, but R=0, G=0, and B=0, i.e., a black part is formed in their intermediate part. This is a problem posed when the substitute pixel positions are independently determined for R, G, and B. This problem can be solved by calculating luminance L and determining a common substitute pixel position based on L like in this embodiment.

As described above, in this embodiment, luminance L is generated from RGB signals in STEP 2501, and the substitute pixel position is determined based on luminance L in STEP 2512. With this process, only one substitute pixel position common to RGB can always be determined independently of the signal distribution patterns of RGB signal values. This allows adjusting free from any problem of color misregistration caused by determining independent substitute pixel positions for RGB signals.

As can be seen from the above description, when a G signal is used as an L signal without using the L signal of this embodiment, only one substitute pixel position common to RGB can similarly be determined. Hence, this also allows adjusting free from any problem of color misregistration.

In this embodiment, since the substitute level for the substitute candidate pixel is continuously changed with respect to a color image, the tonality of a natural image can be maintained. Also, by increasing a text emphasis amount and decreasing a halftone emphasis amount, a more favorable result free from any moiré can be obtained.

Upon independently detecting edge directions without using any representative value signals, different edge directions may be detected for RGB. In this case, different substitute pixel positions may be selected for RGB, and Grd and Lap values must also be calculated for RGB. Using this embodiment, Grd and Lap values need only calculated for once based on representative value signals, and processes can be simple compared to independent calculations for RGB.

As described above, since the edge direction is detected from representative value signals in this embodiment, the edge in the same direction can always be detected. This can also reduce the calculation volume, resulting in simple processes.

OTHER EMBODIMENTS

The embodiments of the present invention have been explained in detail. The present invention may be applied to either a system constituted by a plurality of devices, or an apparatus consisting of a single device.

Note that the present invention includes a case wherein the invention is achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk, and magneto-optical disk may be used. Also, MO, CD-ROM, CD-R, CD-RW, magnetic tape, nonvolatile memory card, ROM, DVD (DVD-ROM, DVD-R), and the like may be used.

As another use method, a connection is established to the Internet site using a browser of a client PC, and the program itself according to the present invention or a file that further includes an automatic installation function may be downloaded to a recording medium such as a hard disk or the like. Also, the program code that forms the program of the present invention may be segmented into a plurality of files, which may be downloaded from different homepages. That is, the present invention includes a WWW server which makes a plurality of users download a program required to implement the functional processes of the present invention by the computer. Furthermore, a storage medium such as a CD-ROM or the like, which stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention.

Moreover, the functions of the aforementioned embodiments can be implemented by some or all of actual processes executed by an OS or the like which runs on a computer based on instructions of the program.

In addition, the scope of the present invention includes a case in which the program according to the present invention is written in a memory of a function expansion unit of a PC, and a CPU equipped on that function expansion unit executes some or all of actual processes.

According to the present invention, an appropriate adjusting processing can be applied to an image including multicolor image signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-180379 filed on Jun. 29, 2006, which is hereby incorporated by reference herein in its entirety.

What is claimed is:

1. An image processing apparatus for applying an adjusting process to an image including multicolor image signals, comprising:
an extracting unit arranged to extract an image area including a pixel to be processed;
a generation unit arranged to generate one representative signal value from signal values corresponding to a plurality of colors of respective pixels included in the image area;
a feature amount calculation unit arranged to calculate a feature amount associated with the pixel to be processed based on the representative signal value;
a unit arranged to select a substitute candidate pixel common to the plurality of colors from the image area based on the calculated feature amount; and
a unit arranged to substitute signal values of the pixel to be processed by new pixel values, which are calculated from the signal values of the pixel to be processed and signal values of the substitute candidate pixel.

2. The apparatus according to claim 1, wherein said feature amount calculation unit calculates, as the feature amount, a value obtained by calculating a primary derivative of the representative signal value and a value obtained by calculating a secondary derivative of the representative signal value.

3. The apparatus according to claim 1, wherein the multicolor image signals are RGB signals.

4. The apparatus according to claim 1, wherein the multicolor image signals are signals including lightness and color difference components.

5. The apparatus according to claim 1, wherein said generation unit generates the representative signal value from a signal value representing a luminance.

6. The apparatus according to claim 1, wherein said generation unit generates the representative signal value from one of the multicolor image signals.

7. An image processing apparatus for applying an adjusting process to an image including multicolor image signals, comprising:
an extracting unit arranged to extract an image area including a pixel to be processed;
an edge direction determination unit arranged to determine an edge direction in the image area;
a selection unit arranged to select a substitute candidate pixel from a pixel group included in the edge direction; and
a unit arranged to substitute signal values of the pixel to be processed by new pixel values, which are calculated from the signal values of the pixel to be processed and signal values of the substitute candidate pixel.

8. The apparatus according to claim 7, further comprising a generation unit arranged to generate one representative signal value from signal values corresponding to a plurality of colors of respective pixels included in the image area, wherein said edge direction determination unit determines the edge direction using a value obtained by calculating a primary derivative of the representative signal value.

9. The apparatus according to claim 7, wherein when a secondary derivative value obtained by calculating a secondary derivative of the signal values of the pixel to be processed is positive, said selection unit selects a pixel with minimum signal values as the substitute candidate pixel, and when the secondary derivative value is negative, said selection unit selects a pixel with maximum signal values as the substitute candidate pixel.

10. The apparatus according to claim 9, wherein when the secondary derivative value is "0", said selection unit selects a pixel with minimum or maximum signal values with reference to a sign of a value obtained by calculating a secondary derivative of signal values of pixels which neighbor the pixel to be processed.

11. The apparatus according to claim 7, wherein said edge direction determination unit compares primary derivative values of signal values of pixel sequences in a plurality of directions including the pixel to be processed in the image area, and determines a direction that exhibits a maximum primary derivative value as the edge direction.

12. An image processing apparatus for applying an adjusting process to an image including multicolor image signals, comprising:
    an extracting unit arranged to extract an image area including a pixel to be processed;
    a generation unit arranged to generate one representative signal value from signal values corresponding to a plurality of colors of pixels included in the image area;
    a feature amount calculation unit arranged to calculate a feature amount associated with the pixel to be processed based on the representative signal value;
    a unit arranged to select a substitute candidate pixel common to the plurality of colors from the image area based on the calculated feature amount;
    an edge direction determination unit arranged to determine an edge direction based on the representative signal value in the image area;
    a selection unit arranged to select a substitute candidate pixel from a pixel group included in the edge direction; and
    a unit arranged to substitute signal values of the pixel to be processed by new pixel values, which are calculated from the signal values of the pixel to be processed and signal values of the substitute candidate pixel.

13. The apparatus according to claim 12, further comprising a generation unit arranged to generate one representative signal value from signal values corresponding to a plurality of colors of respective pixels included in the image area, wherein said edge direction determination unit determines the edge direction using a value obtained by calculating a primary derivative of the representative signal value.

14. The apparatus according to claim 12, wherein when a secondary derivative value obtained by calculating a secondary derivative of the signal values of the pixel to be processed is positive, said selection unit selects a pixel with minimum signal values as the substitute candidate pixel, and when the secondary derivative value is negative, said selection unit selects a pixel with maximum signal values as the substitute candidate pixel.

15. The apparatus according to claim 14, wherein when the secondary derivative value is "0", said selection unit selects a pixel with minimum or maximum signal values with reference to a sign of a value obtained by calculating a secondary derivative of signal values of pixels which neighbor the pixel to be processed.

16. The apparatus according to claim 12, wherein said edge direction determination unit compares primary derivative values of signal values of pixel sequences in a plurality of directions including the pixel to be processed in the image area, and determines a direction that exhibits a maximum primary derivative value as the edge direction.

17. An image processing method for applying an adjusting process to an image including multicolor image signals, comprising the steps of:
    extracting an image area including a pixel to be processed;
    generating one representative signal value from signal values corresponding to a plurality of colors of pixels included in the image area;
    calculating a feature amount associated with the pixel to be processed based on the representative signal value;
    selecting a substitute candidate pixel common to the plurality of colors from the image area based on the calculated feature amount; and
    substituting signal values of the pixel to be processed by new pixel values, which are calculated from the signal values of the pixel to be processed and signal values of the substitute candidate pixel.

18. An image processing method for applying an adjusting process to an image including multicolor image signals, comprising the steps of:
    extracting an image area including a pixel to be processed;
    generating one representative signal value from signal values corresponding to a plurality of colors of pixels included in the image area;
    calculating a feature amount associated with the pixel to be processed based on the representative signal value;
    selecting a substitute candidate pixel common to the plurality of colors from the image area based on the calculated feature amount;
    determining an edge direction based on the representative signal value in the image area;
    selecting a substitute candidate pixel from a pixel group included in the edge direction; and
    substituting signal values of the pixel to be processed by new pixel values, which are calculated from the signal values of the pixel to be processed and signal values of the substitute candidate pixel.

19. A non-transitory computer readable medium embodied with an image processing program for applying an adjusting process to an image including multicolor image signals, said program making a computer execute the steps of:
    extracting an image area including a pixel to be processed;
    generating one representative signal value from signal values corresponding to a plurality of colors of pixels included in the image area;
    calculating a feature amount associated with the pixel to be processed based on the representative signal value;
    selecting a substitute candidate pixel common to the plurality of colors from the image area based on the calculated feature amount; and
    substituting signal values of the pixel to be processed by new pixel values, which are calculated from the signal values of the pixel to be processed and signal values of the substitute candidate pixel.

20. A non-transitory computer readable medium embodied with an image processing program for applying an adjusting process to an image including multicolor image signals, said program making a computer execute the steps of:
    extracting an image area including a pixel to be processed;

generating one representative signal value from signal values corresponding to a plurality of colors of pixels included in the image area;

calculating a feature amount associated with the pixel to be processed based on the representative signal value;

selecting a substitute candidate pixel common to the plurality of colors from the image area based on the calculated feature amount;

determining an edge direction based on the representative signal value in the image area;

selecting a substitute candidate pixel from a pixel group included in the edge direction; and substituting signal values of the pixel to be processed by new pixel values, which are calculated from the signal values of the pixel to be processed and signal values of the substitute candidate pixel.

* * * * *